United States Patent [19]
Kondo et al.

[11] Patent Number: 5,593,778
[45] Date of Patent: Jan. 14, 1997

[54] BIODEGRADABLE COPOLYESTER, MOLDED ARTICLE PRODUCED THEREFROM AND PROCESS FOR PRODUCING THE MOLDED ARTICLE

[75] Inventors: Yoshikazu Kondo, Hofu; Masao Matsui, Takatsuki; Hideo Yoshidome, Kishiwada; Takuji Osaki, Sanda; Hiroshi Kajiyama, Hofu; Eiichi Ozeki; Yasuhiro Fujii, both of Kyoto, all of Japan

[73] Assignees: Kanebo, Ltd., Tokyo; Shimadzu Corporation, Kyoto, both of Japan

[21] Appl. No.: 433,324

[22] PCT Filed: Sep. 8, 1994

[86] PCT No.: PCT/JP94/01489

§ 371 Date: May 5, 1995

§ 102(e) Date: May 5, 1995

[87] PCT Pub. No.: WO95/07311

PCT Pub. Date: Mar. 16, 1995

[30] Foreign Application Priority Data

Sep. 9, 1993 [JP] Japan ................................. 5-224767
May 6, 1994 [JP] Japan ................................. 6-117490
May 6, 1994 [JP] Japan ................................. 6-117491

[51] Int. Cl.$^6$ .................... D02G 3/00; C08F 20/00; B27B 3/08
[52] U.S. Cl. .................... 428/373; 528/272; 528/294; 528/354; 528/361; 528/363; 528/364; 528/365; 525/437; 525/439; 525/444; 264/239
[58] Field of Search ................. 528/361, 363, 528/365, 364, 272, 294, 354; 525/437, 439, 444; 264/239; 428/373, 374

[56] References Cited

U.S. PATENT DOCUMENTS 4,826,945  5/1989  Cohn et al. ................................. 528/76

FOREIGN PATENT DOCUMENTS 0166596  1/1986  European Pat. Off. .
5-093318  4/1993  Japan .
5-132549  5/1993  Japan .

OTHER PUBLICATIONS

Supplementary Partial European Search Report for Appln. No. EP 94 92 6374 Piero Cerrai et al., "Block copolymers from L–lactide and poly(ethylene glycol) through a non-catalyzed route", Die Makromol. Chem., Rapid Commun., vol. 14, No. 9, 1993, pp. 529–538.

Hans R. Kricheldorf et al., "ABA triblock copolymers of L–lactide and poly(ethylene glycol), Die Makromol. Chem", vol. 194, Feb. 93, pp. 715–725.

Zbigniew Jedlinski et al., "Synthesis of ethylene glycol–L–lactide block copolymers" Die Makromol. Chem., vol. 194, Jun. 1993, pp. 1681–1689.

*Primary Examiner*—Samuel A. Acquah
*Attorney, Agent, or Firm*—Varndell Legal Group

[57] ABSTRACT

A biodegradable copolyester having an average molecular weight of at least 50,000 produced by copolymerizing a lactic acid component as the main component with PEG, an aliphatic polyester or a sulfo group-containing ester-forming compound, a molded article produced using it, such as a conjugate fiber, and a process for producing the molded article.

24 Claims, 10 Drawing Sheets

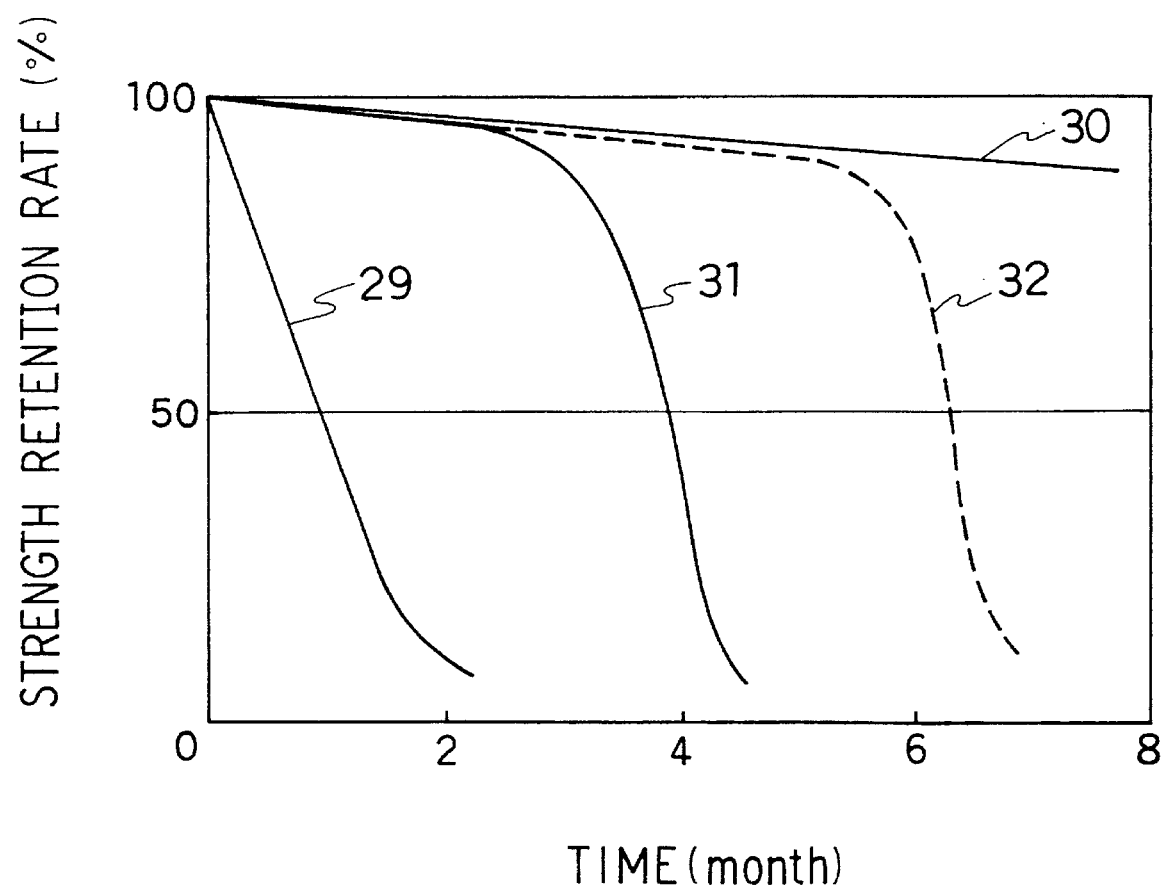

BIODEGRADABLE COPOLYESTER, MOLDED ARTICLE PRODUCED THEREFROM AND PROCESS FOR PRODUCING THE MOLDED ARTICLE

This application is a 371 of PCT/JP94/01489 filed Sep. 8, 1994.

TECHNICAL FIELD

The present invention relates to a novel biodegradable copolyester having a versatility which is applicable to fibers, films, containers and the like and is improved in toughness, degradability, heat resistance and dyeing ability, a molded article having improved mechanical properties such as toughness produced using the copolyester (for example, polylactic acid fibers having a biodegradability and suitable for preparing fibrous structures such as a non-woven fabric, conjugate fibers having a controlled biodegradability or a hydrolyzability in neutral environment, conjugate fibers capable of being divided easily even under neutral or weak alkaline environment and capable of forming into fine fiber, ultrafine fiber or fiber having special section, and fibrous structures prepared using them), and a process for producing the molded article.

BACKGROUND ART

Complete circulation type degradable polymers which are finally degraded into carbon dioxide and water by degradation by means of microorganisms under natural environment and/or by hydrolysis under neutral environment, attract attention recently from the viewpoint of environmental protection.

For example, among such polymers, polyhydroxybutyrate (hereinafter referred to as "PHB"), polycaprolactone (hereinafter referred to as "PCL") and polylactic acid are known as a melt-moldable and biodegradable polymer.

However, not only PHB requires a large energy in recovery and purification of the polymer because of biosynthesis by microorganisms, thus the production cost is too high, but also molding thereof is difficult because it is difficult to control the molecular weight and the crystallinity. Also, it is difficult to control the physical properties of the molded articles such that the molded articles are poor in transparency. Thus, it is the actual circumstances that it is not easy to industrially and inexpensively provide performances and moldability which meet the uses.

Also, PCL has a serious problem and an obstacle in practical use that the creep during use is large since its melting point is as low as 60° C. and, therefore, the articles prepared therefrom are poor in shape stability or the strength is extremely lowered depending on the use temperature.

On the other hand, polylactic acid is relatively inexpensive, and is a thermoplastic resin having a sufficient heat resistance since its melting point is 178° C. Thus, it is melt-moldable and the use as fibers for clothing and industrial purposes is expected. Also, although the polylactic acid is a biodegradable polymer excellent on practical use, it has the problems in production and processing that (1) polylactic acid homopolymer is poor in melt-moldability due to too high crystallinity, and moreover, the molded articles, films, fibers and the like obtained therefrom are not sufficient in toughness, and also are fragile and low in impact strength (having a rigid crystal structure), (2) the dye affinity is poor, (3) the molecular weight of polylactic acid cannot be sufficiently raised, (4) if polylactic acid is heated, the molecular weight is decreased, resulting in deterioration of strength and the like of the final products, and in addition, a technique to produce practical fibers for clothing and for industrial use from polylactic acid has not yet been established, (5) it is behind technical development for commercialization as fiber products.

For such a reason, a very limited use such as thread for suture utilizing the biocompatibility is only hitherto known.

Also, Japanese Patent Publication Kokai No. 1-163135 discloses a drug sustained release base material for releasing drug into living body, which is obtained by reacting a polymer or copolymer of lactic acid having a molecular weight of 300 to 10,000 with a polyoxyethylene glycol (hereinafter referred to as "PEG") having a molecular weight of 150 to 10,000 in an equivalent ratio of PEG to the polylactic acid of 0.3 to 5.0 (30 to 500%).

However, the obtained copolymer is contemplated to use mainly in a living body. Its softening point (temperature at which stringiness begins to occur with a glass bar on a hot plate) is as very low as from −10° to 60° C., and the molecular weight is supposed to be at most about 10,000 to about 20,000, based on the above-mentioned softening point, ratio of reaction raw materials and state of the product (paste-like or wax-like). Therefore, molded articles excellent in versatility and toughness cannot possibly be obtained therefrom.

Also, Japanese Patent Publication Kokai No. 63-69825 discloses a block copolymer of 70 to 97% (% by weight, hereinafter the same) of polylactic acid segments and 3 to 30% of. polyoxyethylene dicarboxylic acid segments. It is described therein that the reason why the polyoxyethylene dicarboxylic acid is used is that if PEG is reacted at the time of polymerization of a cyclic dimer of lactic acid (hereinafter referred to as "lactide"), the terminal hydroxyl groups of PEG hinders the polymerization, so the copolymer having a low degree of polymerization is only obtained.

However, the products obtained in the examples of Japanese Patent Publication Kokai No. 63-69825 are only those having a molecular weight of at most 31,000 and a tensile strength of the film of only 2.8 kg/mm² (about ¹⁄₁₀ of the product of the present invention), even if polyoxyethylene dicarboxylic acid is used. Further, polyoxyethylene dicarboxylic acid is fairly expensive as compared with PEG and, therefore, the products are not wholly satisfactory also from the viewpoint of versatility.

Besides polymers having biodegradability as mentioned above and artificial fibers prepared therefrom, cotton, wool, silk and the like which are natural fibers also have a biodegradability, but there are limits in strength, fineness, length and the like, so the uses thereof are limited.

Also, in general, if natural fibers are retained in the soil or water rich in bacteria, the degradation progresses in about 1 to 3 months, and they have the defect that the article life is too short.

For such a reason, artificial fibers which can be produced to have a desired thickness and length and which have a rate of degradation or rate of deterioration according to necessity, have been strongly demanded.

Also, conjugate fibers which can be divided by a chemical treatment to produce, for example, ultrafine fibers, have been widely utilized. For example, conjugate fibers that the division is possible by treating with an aqueous solution of a strong alkali (sodium hydroxide and the like) to hydrolyze polyesters, are disclosed in Japanese Patent Publication Kokai No. 57-29610, No. 59-187672 and No. 1-292124. Also, conjugate fibers which can be divided by dissolving and removing a soluble polymer (e.g. polystyrene) with a solvent (hydrocarbon, polar solvent, halogenated compound or the like), are proposed in Japanese Patent Publication Kokai No. 61-282445, etc.

However, these conventional dividable conjugate fibers have many problems in safety and environmental protection, since aqueous strong alkali solutions or organic solvents are used in the division.

For example, since alkali hydrolysis uses an aqueous solution of sodium hydroxide having a high concentration (e.g. 1% or more, especially about 3 to about 10%), a large amount of an acid is required in neutralization of waste water after the hydrolysis treatment. Further, the hydrolysis products (sodium terephthalate, etc.) have a low rate of biodegradation and accordingly become a source of environmental pollution. Similarly, in case of using solvents, it is difficult to completely recover the solvents and the dissolved polymers from the waste water, resulting in source of environmental pollution. Also, if the dangerous aqueous strong alkali solutions or the solvents are used and the treatment of the waste water thereof is further conducted sufficiently, not only difficulties on working are encountered, but also expensive equipments and high operating cost are required, thus economically disadvantageous.

It is an object of the present invention to provide a novel polylactic acid copolymer (biodegradable copolyester) which is improved in moldability and toughness and is improved in rate of degradation, impact strength and/or dye affinity and moreover has a sufficient heat resistance and which is relatively inexpensive and can be used in a wide range of uses.

A further object of the present invention is to provide molded articles prepared by melt-molding the above-mentioned polylactic acid copolymer (for example, a melt-adhesive fiber of the polylactic acid copolymer having a melt-adhesion property as well as a biodegradability and suitable for preparing fiber structures having a complete circulation type biodegradability such as non-woven fabrics and woven and knit fabrics; a novel fiber which is biodegradable or is hydrolyzable under a natural environment, and that it is possible to control its life (period of use) within a wide range in accordance with necessity and to afford with a high reliability a very favourable characteristic such that deterioration in strength and physical properties is relatively less during the use and rapidly proceeds after the life; an improved novel dividable conjugate fiber which can be easily divided under neutral or weak alkaline environment and whose hydrolysis products can be easily degraded to prevent environmental pollution, and which is low in waste of resource and is advantageous also in cost and a fiber structure produced utilizing it).

Another object of the present invention is to provide a novel process for producing polylactic acid copolymer moldings having a high strength which are improved in formability and toughness and can be used in a wide range of uses at low cost.

BRIEF DESCRIPTION OF THE DRAWINGS

FIG. 12 is a graph showing an example of a dependency of strength retention rate on time in a hydrolysis test of a fiber which is the molded article of the present invention and a fiber for comparison;

DISCLOSURE OF THE INVENTION

Figure 1:
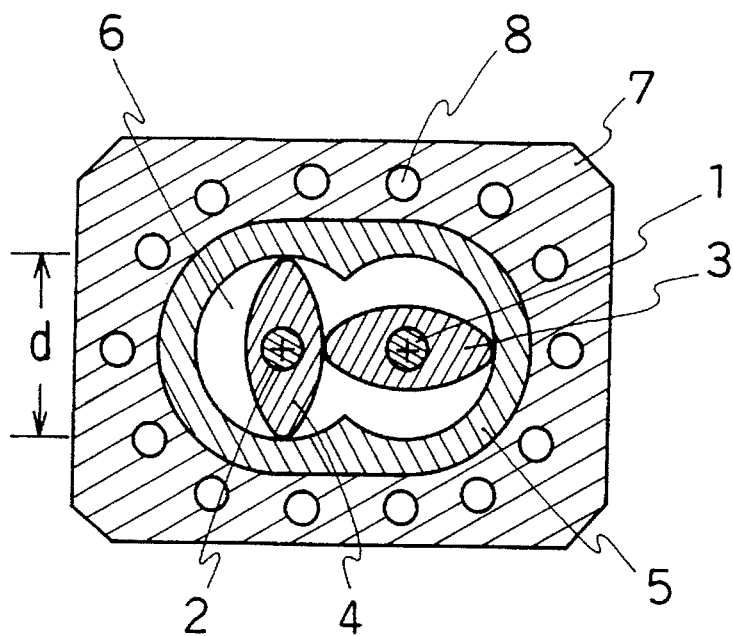
FIG. 1 is an illustrative transverse sectional view of a twin-screw kneading extruder (hereinafter also referred to as "twin-screw kneader") which is a continuous polymerization apparatus suitable for use in preparing the biodegradable copolyesters of the present invention.

The present invention relates to a biodegradable copolyester comprising an L-lactic acid and/or D-lactic acid component as a main component and having an average molecular weight of at least 50,000, produced by copolymerizing said lactic acid component with at least one member of (A) a polyethylene glycol (PEG) having a number average molecular weight of at least 300, (B) an aliphatic polyester and (C) a sulfo group-containing aromatic compound having two ester-forming groups (hereinafter also referred to as "sulfo group-containing ester-forming compound").

The present invention also relates to the biodegradable copolyester as described above, where the biodegradable copolyester comprising the L-lactic acid and/or D-lactic acid component as a main component is produced by copolymerizing with the polyethylene glycol having a number average molecular weight of at least 300 is one produced by copolymerizing 99.9 to 85% of the L-lactic acid and/or D-lactic acid component and 0.1 to 15 % by weight of the polyethylene glycol having a number average molecular weight of at least 300, and the melting point is not less than 110° C.

The present invention also relates to the biodegradable copolyester as described above, where the biodegradable copolyester comprising the L-lactic acid and/or D-lactic acid component as a main component is produced by copolymerizing with the aliphatic polyester is one produced by copolymerizing 99.5 to 85% by weight of the L-lactic acid and/or D-lactic acid component and 0.5 to 15% of the aliphatic polyester, and the average molecular weight is not less than 80,000 and the melting point is not less than 110° C.

The present invention also relates to the biodegradable copolyester as described above, where the biodegradable copolyester comprising the L-lactic acid and/or D-lactic acid component as a main component is produced by copolymerizing with the sulfo group-containing aromatic compound having two ester-forming groups is one produced by copolymerizing 99.5 to 80% by weight of the L-lactic acid and/or D-lactic acid component and 0.5 to 20% of the sulfo group-containing aromatic compound having two ester-forming groups.

The present invention further relates to a molded article obtained by melt-forming a biodegradable copolyester comprising an L-lactic acid and/or D-lactic acid component as a main component and having an average molecular weight of at least 50,000, said copolyester being produced by copolymerizing said lactic acid component with at least one member of (A) a polyethylene glycol having a number average molecular weight of at least 300, (B) an aliphatic polyester and (C) a sulfo group-containing aromatic compound having two ester-forming groups.

The present invention also relates to the molded article as described above, where the molded article produced by melt-formation is a conjugate fiber comprising (a) a biodegradable copolyester having a melting point Ta and (b) a biodegradable copolyester which has a melting point lower than Ta by at least 10° C. or which is amorphous and has no melting point.

The present invention also relates to the molded article as described above, where the molded article produced by melt-forming is composed of a sheath made of a less degradable copolyester that the rate of degradation by biodegradation or by hydrolysis in neutral water or aqueous solution is low, and a core made of a biodegradable copolyester having a rate of degradation of at least 2 times the rate of degradation of said sheath, and both said core and sheath components are molecular-orientated.

The present invention also relates to the molded article as described above, where the molded article produced by melt-forming is a dividable conjugate fiber made of said biodegradable copolyester and a fiber-forming copolyester containing at least 40% by weight of a component derived from an aromatic compound, wherein said fiber-forming copolyester is divided by said biodegradable copolyester into a plurality of segments in the transverse section of the single fiber and said biodegradable copolyester occupies at least a part of the fiber surface.

The present invention still further relates to biodegradable copolyester comprising an L-lactic acid, D-lactic acid and/or their cyclic dimer (lactide) component as a main component, which comprises continuously polymerizing in the molten state a mixture containing said lactic acid component and at least one member of (A) a polyethylene glycol having a number average molecular weight of at least 300, (B) an aliphatic polyester and (C) a sulfo group-containing aromatic compound having two ester-forming groups to produce the biodegradable copolyester having an average molecular weight of at least 50,000, introducing the copolyester directly to a molding machine without solidification and pelletization, and melt-forming it.

The present invention also relates to the process described above, where 99.5 to 85% by weight of L-lactic acid, D-lactic acid and/or a cyclic dimer thereof (lactide) and 0.1 to 15% of by weight of polyethylene glycol having a number average molecular weight of at least 300 are continuously copolymerized in a molten state, and the obtained biodegradable copolyester having an average molecular weight of at least 70,000 is directly led to a spinning head without solidification and pelletization, and is subjected to melt-spinning, drawing at least 3 times and heat-treatment to impart a fiber strength of at least 3 g/d with maintaining an average molecular weight of at least 70,000.

The biodegradable copolyester of the present invention is, as mentioned above, a biodegradable copolyester comprising an L-lactic acid and/or D-lactic acid component as a main component and having an average molecular weight of at least 50,000, produced by copolymerizing the lactic acid component with at least one member of (A) a polyethylene glycol having a number average molecular weight of at least 300, (B) an aliphatic polyester and (C) a sulfo group-containing ester-forming compound.

The average molecular weight in the biodegradable copolyester of the present invention means a weight average molecular weight of high molecular weight compounds (excepting those having a molecular weight of not more than 500) by GPC analysis (by calibration based on standard polystyrene samples) of a 0.1% chloroform solution of the copolyester.

The above-mentioned L-lactic acid and/or D-lactic acid component (hereinafter also referred to as "lactic acid component") is a component to impart good biodegradability and hydrolyzability and also to impart toughness, heat resistance and crystallinity to the biodegradable copolyester of the present invention.

The polyethylene glycol having a number average molecular weight of at least 300 used as the component (A) to form the copolyester with the lactic acid component is a component to impart good formability (drawing property, spinning property), impact resistance and hydrophilic property to the biodegradable copolyester of the present invention. The aliphatic polyester (B) is a component which serves to impart a good formability (drawing property, spinning property) to the biodegradable copolyester of the present invention with control in biodegradation rate and crystallinity (degree of crystallization) and improvement in thermal characteristics of the copolyester. The sulfo group-containing ester-forming compound (C) is a component used to impart a hydrophilic property and to control the biodegradation rate while improving the dye affinity of the biodegradable copolyester of the present invention so as to be dyeable with cationic dyes.

The biodegradable copolyesters of the present invention are products of copolymerization of the lactic acid component with one of the components (A) to (C), or with two or more of the components (A) to (C), namely the components (A) and (B), the components (A) and (C), the components (B) and (C) or the components (A), (B) and (C), and the main component of the copolyester is the lactic acid component.

That the main component is the lactic acid component means that the biodegradable copolyester of the present invention contains at least 80%, especially at least 85%, further especially at least 90%, of the lactic acid component, more especially from not less than 92% to not more than 99.9%, especially not more than 99%, more especially not more than 98%, of the lactic acid component. As a result, there are obtained the effects that the biodegradability, toughness, heat resistance and biocompatibility become good.

From the viewpoints of good formability (spinning property, injection moldability) and good biodegradability, it is preferable that the average molecular weight of the copolyester is not less than 50,000, especially not less than 80,000, more especially not less than 100,000, and is at most 500,000, especially at most 250,000.

The biodegradability of the biodegradable copolyester can be evaluated by observing the weight, strength, shape and molecular weight of samples in the form of fiber, film or plate placed in water, soil or activated sludge with the lapse of time. For example, the biodegradability may be evaluated good if the tensile strength is decreased to not more than ½, preferably not more than ⅓, more preferably not more than ¼, when the fiber is immersed in an activated sludge (ASTM D 5271-93) for 6 months.

Like this, since the biodegradable copolyesters of the present invention are those produced by copolymerizing the lactic acid as a main component with the components (A) to (C), preferably by block-copolymerizing them, the impact resistance, formability, heat stability and dyeing property and the like of polylactic acid are improved with keeping the properties of the polylactic acid such as high melting point and high strength.

Copolyesters of the lactic acid component and the component (A) (hereinafter also referred to as "copolyester (A)") will be explained below.

With respect to the copolymerization proportions of the lactic acid component and the component (A) in the copolyester (A), the proportion of the component (A) in the copolyester (A) is from 0.1 to 15% by weight, preferably 0.3 to 10% by weight, more preferably 0.5 to 8% by weight. There is a tendency that the higher the proportion of the component (A), the softer the copolyester becomes, and the melting point is lowered and the degree of polymerization is hard to rise. The higher the molecular weight of the component (A), the less the degrees of the lowering in degree of polymerization and melting point. Therefore, in case of using the component (A) having a low molecular weight, it is not desirable to increase the copolymerization proportion too much. For example, it is preferable that the proportion of the component (A) is from 0.3 to 3.9% in case of the component (A) having a number average molecular weight of 1,000, from 0.3 to 6.8% in case of the component (A) having a number average molecular weight of 3,000, from 0.3 to 9.4% in case of the component (A) having a number average molecular weight of 6,000, and from 0.3 to 12% in case of the component (A) having a number average molecular weight of 10,000.

The present inventors have found experimentally that there is a relationship of equation (III) between the number average molecular weight (x) of the component (A) and the preferable copolymerization proportion (y) thereof.

$$0.3 \leq y(\%) \leq [(x-300)/8 \times 10^5]^{1/2} \times 100 + 1 \qquad (III)$$

There is a tendency that the higher the copolymerization proportion of the component (A), the larger the hydrophilic property, rate of alkali hydrolysis and rate of biodegradation of the copolyester (A) become, and the elasticity such as Young's modulus and the heat resistance such as melting point of the copolyester (A) are lowered as compared with the lactic acid homopolymer. It is preferable to select the molecular weight and copolymerization proportion of the component (A) in accordance with the purpose of the use.

Also, with respect to the molecular weight of the copolyester (A), the average molecular weight is at least 50,000 from the viewpoint that the molded articles thereof (including films and fibers) are excellent in toughness, and is preferably at least 60,000, more preferably from 80,000 to 300,000. The fluidity at the time of melting and the formability are inferior if the molecular weight is excessively high, and from such a point of view the average molecular weight is at most 500,000, preferably not more than 400,000, more preferably not more than 300,000.

Further, with respect to the manner of binding between the lactic acid component and the component (A) in the copolyester (A), they are bound basically in such a manner that a carboxyl group in the lactic acid component is condensed to a terminal hydroxyl group of the component (A), and a carboxyl group of another lactic acid is condensed to the hydroxyl group of the condensed lactic acid component. Further, optionally used third components mentioned after bind thereto as a chain extending agent, or as a group for controlling biodegradation, a group for forming a microdomain structure, a group for improving the dyeing property, a group for imparting a hydrophilic property, or the like.

Such copolyesters (A) have a melting point of not less than 110° C. The higher the melting point, the more preferable from the viewpoint of heat resistance. For example, molded articles such as food containers are required to be able to make a sterilization treatment with boiling water of 100° C., and for meeting this requirement it is necessary that the melting point is not less than 110° C., and it is particularly preferred that the melting point is not less than 130° C. Similarly, in case of using as a fiber too, it is required to withstand dyeing and sterilization at 100° C., and for meeting this requirement it is necessary that the melting point is not less than 110° C., and it is particularly preferred that the melting point is not less than 130° C. Further, it is desirable to withstand severe sterilization (high pressure steam of 130° C.) and high pressure dyeing (high pressure water bath of 130° C.), and to meet this requirement it is preferable that the melting point is not less than 150° C.

Explanation is given below with respect to the lactic acid and the component (A) constituting the copolyester (A).

The lactic acid component may be included in any form of polymer units of L-lactic acid and/or D-lactic acid and/or their cyclic dimers (lactide), that is to say, a unit of poly(L-lactic acid) (hereinafter also referred to as "PLLA"), a unit of poly(D-lactic acid) (hereinafter also referred to as "PDLA") and a unit of copolymer of L-lactic acid and D-lactic acid (hereinafter also referred to as "PL/DLA"). It is preferable that PLLA or PDLA homopolymer units are formed.

In case of forming PL/DLA units, it is preferable to form the units wherein a slight amount, e.g. not more than 5%, preferably not more than 2%, more preferably not more than 1%, of an optical isomer is copolymerized. Although PLLA and PDLA are both preferably used for the purpose of the present invention, it is efficient to prepare L-lactic acid (low cost) rather than the other when the raw material lactic acid is prepared by a fermentation method. Therefore, PLLA or copolymers containing it as a main component are preferable. If the optical isomer is copolymerized in an amount exceeding 5 degrees of lowering in crystallinity, heat resistance and strength of polylactic acid become large.

Although PEG which is the component (A) constituting the copolyester (A) is a polymer of ethylene oxide, the PEG comprehends those containing a starting material to which ethylene oxide is addition-reacted, wherein ethylene oxide is added to the starting material, e.g., water or ethylene glycol, bisphenol A, an alkylamine having a $C_1$ to $C_{20}$ alkyl group, or a tri- or more valent compound such as glycerol, trimethylolpropane, pentaerythritol, sorbitol or castor oil. As the component (A), there can also be used polymers prepared by addition of ethylene oxide to an aliphatic polyester wherein a polymer of a hydroxy acid such as lactic acid, glycolic acid, hydroxycaproic acid, hydroxyvaleric acid or hydroxybutyric acid is introduced into the above-mentioned tri- or more valent compound.

For instance, in case of containing PEG having a branch, the impact resistance and the heat resistance are improved.

The component (A) is required to have a molecular weight of not less than 300 in terms of number average molecular weight. In order to obtain the copolyester (A) having a high degree of polymerization and a high melting point, the higher the molecular weight of the component (A), the better. Preferably, the molecular weight is at least 1,000, especially 3,000, further from 5,000 to 30,000, especially from 8,000 to 30,000.

The copolyester (A) may contain a third component by copolymerizing the lactic acid component as the main component and the component (A) with the third component. Examples of the third component are, for instance, a dicarboxylic acid component used for example to balance the hydroxyl group of the component (A), a sulfo group-containing compound used for example to improve the dyeing property (for example, it is possible to make dyeable with a basic dye by copolymerization with sulfoisophthalate or its metal salt), a compound having amino or amido group (for example, it is possible to make dyeable with an acid dye by copolymerization with an amino acid), and the like.

With respect to the above-mentioned balancing the hydroxyl group of the component (A), both ends of the lactic acid component are carboxyl group and hydroxyl group, and addition of the component (A), which has hydroxyl groups at both ends (PEG), to the lactic acid component results in presence of excess hydroxyl group, and the reaction stops when all carboxyl groups have reacted. The larger the amount of PEG added, and the smaller the molecular weight of PEG, the more the balance in molar ratio between carboxyl group and hydroxyl group is lost, thus only products having a low degree of polymerization are obtained. This unbalance can be eliminated by adding a substantially equimolar amount of the dicarboxylic acid component based on the hydroxyl group of PEG to the polymerization system.

The above-mentioned substantially equimolar amount means that the ratio of the dicarboxylic acid component to the component (A) is from 0.8 to 1.2 by equivalent (substantially by mole), preferably 0.9 to 1.1 by equivalent. Of course, even if the equivalent ratio is less than 0.8 or exceeds 1.2, effects are obtained in its own way and products having a higher degree of polymerization are obtained as compared with no use.

Examples of the dicarboxylic acid component utilizable are, for instance, an aliphatic dicarboxylic acid having about 4 to about 12 carbon atoms such as adipic acid, sebacic acid or decanedicarboxylic acid; an aromatic dicarboxylic acid having 8 to 20 carbon atoms such as isophthalic acid, terephthalic acid or naphthalene dicarboxylic acid; their acid hydrides; their esters with a low molecular weight alcohol having 1 to 6 carbon atoms such as their methanol ester or their ethylene glycol ester; a dicarboxylic acid halide such as phthaloyl dichloride; and the like.

With respect to a manner of the copolymerization of the dicarboxylic acid component, for example, the molecular weight may be effectively increased by adding and mixing a substantially equimolar amount of phthalic anhydride at the stage that the polymerization proceeds to some extent (middle stage or final stage) to cause it to react with hydroxyl groups each present at the molecular chain end of each of two molecules. For example, adipic acid has a molecular weight of 146 and, therefore, a balance is obtained by addition thereof in an amount of about 1% with respect to PEG having a number average molecular weight of 15,000. In case that the lactic acid component is copolymerized with 3% of PEG having a number average molecular weight of 15,000, only 0.03%, based on the whole, of adipic acid as a balancing agent is sufficient. However, if PEG having a number average molecular weight of 300 is used, it is necessary for balancing to use adipic acid in an amount of about half the PEG.

PEG and the dicarboxylic acid component may be added separately to the reaction system as mentioned above, or they may be previously reacted (polymerized) to produce a polyetherester which is then reacted with lactic acid, lactide and/or polylactic acid. The latter is also an effective method for adding the dicarboxylic acid component to the polymerization system and reacting it. Similarly, utilizable are polyester oligomers having many carboxyl groups obtained by reacting an excess amount of the dicarboxylic acid component with a diol component, for example, an oligomer of hexamethylene adipate prepared in a molar ratio of hexanediol/adipic acid of ½, ⅔, ¾ or the like.

Since these third components to be copolymerized tend to lower the melting point of the obtained copolyester (A), the amount thereof is required to be within the range capable of maintaining the melting point within the predetermined range. It is desirable that the proportion of the third component in the copolyester (A) is usually not more than 2%, especially not more than 1%.

Next, an explanation is given below with respect to a process for the preparation of the copolyester (A).

The copolyester (A) is prepared by, using for example a twin-screw kneading extruder equipped with a vent or a similar apparatus having agitation and delivery functions, reacting the raw material and the polymer in the molten state with agitating, mixing, transferring and degassing, and then continuously taking out.

By preparing the copolyester (A) in such a manner, it is possible to prepare the copolyester (A) having a high degree of polymerization with less decomposition products and less discoloration in a short period of time as compared with a conventional batchwise process.

The twin-screw kneading extruder (twin-screw kneader) includes axes arranged in parallel and rotatable in the same direction or counter direction, which are provided with screws engaged with each other (sending part) and a plurality of two blade-shaped or three blade-shaped agitating elements (many agitating elements) engaged in the same manner. Further, the cylinder (cylindrical part) may be provided, as occasion demands, with a single or a plurality of vent holes for feeding the raw materials or additives or for exhaust in a reaction under reduced pressure.

The polymerization raw materials or the polymer during or after the polymerization is very efficiently agitated, mixed and transferred by the twin-screw kneader to fairly accelerate the rate of reaction. Moreover, dead space where the polymer stagnates or sticks, is scarcely seen.

The agitating elements and screw of one axis are engaged with those of another axis, whereby the polymer or the like is always scraped off mutually (self-cleaning action).

Similarly, the polymer or the like is always scraped off from the inner surface of the cylinder by the agitating elements and the screws, thereby preventing them from sticking thereto for a long time.

Consequently, less-deteriorated, uniform and excellent polymers are obtained.

FIG. 1 shows an instance of an illustrative transverse sectional view of the twin-screw kneader.

In FIG. 1, two blade-shaped (elliptic) agitating elements 3 and 4 which are rotatable in the same or counter direction by two driving shafts 1 and 2, scrape off the reaction product sticking to the surfaces thereof with each other or the reaction product sticking to the inner surface of cylinder 5, thus preventing the polymer or the like from staying at a certain place. Simultaneously, its excellent agitating ability accelerates the rate of reaction of the reaction product travelling through space 6 and raises remarkably the uniformity thereof. Numeral 7 is a heating block, and paths 8 for heat medium are provided therein whereby the cylinder 5 is heated or cooled as occasion demands. The heating of the cylinder 5 may be conducted by electric heating instead of heat medium, and the cooling may be air cooling. Numeral d in the figure shows the inner diameter of the cylinder 5.

Figure 2:
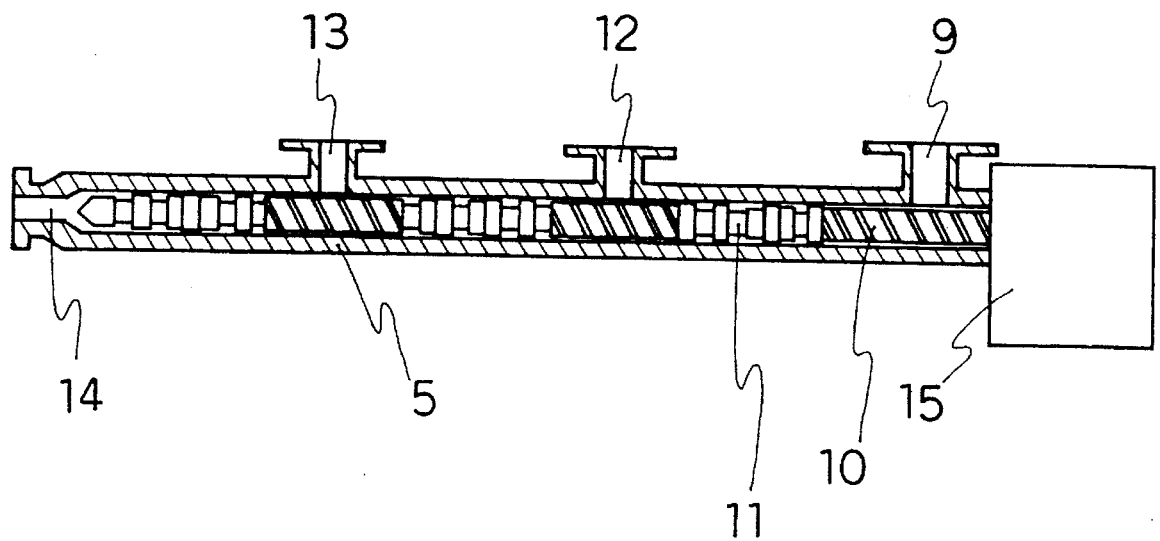
FIG. 2 is an illustrative vertical sectional view of a twin-screw kneader which is a continuous polymerization apparatus suitable for use in preparing the biodegradable copolyesters of the present invention.

FIG. 2 is an illustrative vertical section view of the twin-screw kneader (provided that a kneading device is shown as an illustrative side view).

In the figure, mutually engaging screws are provided on the driving shafts to form liquid-sending part 10, and similarly mutually engaging agitation elements are provided to form kneading part 11. The raw materials fed from feed part 9 are heated and mixed in three liquid-sending parts and three kneading parts, thus transferring in the cylinder with undergoing reaction, and sent out of output port 14. Cylinder 5 is provided with two vents 12 and 13, whereby it is possible to conduct feeding of inert gas, exhaust, pressure reduction by vacuum pump, supplemental feeding of raw material, feeding of additive, and the like. Single screw extruders can be used in the continuous polymerization for preparing the copolyester (A) of the present invention, but twin-screw extruders having excellent features as mentioned above are more preferred. Numeral 15 in the figure is a driving part.

In addition to the above-mentioned kneader-type polymerization apparatus, a horizontal type or vertical type tank-like reactor having a circular, elliptic or similar shaped section wherein a multiplicity of disk-like or similar agitation elements are arranged on two rotation axes so as to overlap with each other, can also be used in the preparation (continuous polymerization) of the copolyester (A), since dead space is a few, it has a self-cleaning action and pressure reduction is possible.

Figure 3:
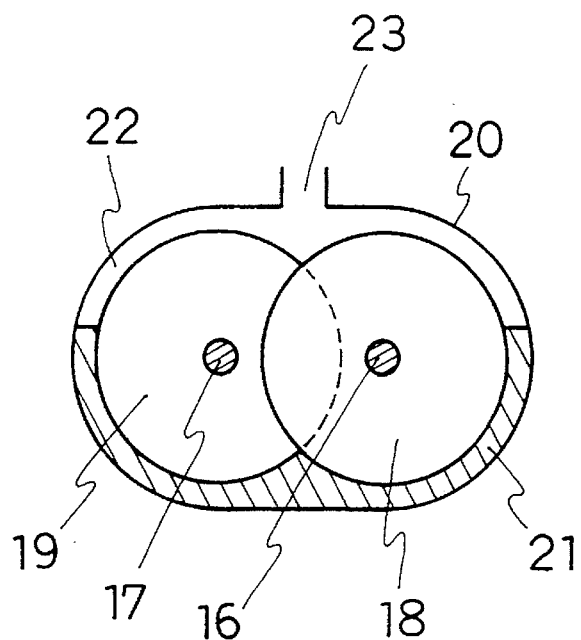
FIG. 3 is an illustrative transverse sectional view of a biaxial stirring reactor suitable for use in preparing the biodegradable copolyesters of the present invention.

FIG. 3 shows an example of an illustrative transverse section view of an instance of the reactor equipped with biaxial agitator.

In FIG. 3, reaction product 21 is agitated and mixed by rotating plates 18 and 19 attached to two driving shafts 16 and 17, and is passed, with the reaction product and polymer adhering to the rotating plates 18 and 19, through space 22 during which reaction products having a low boiling point (water, alcohol, etc.) and the residual monomer are evaporated and discharged from exhaust hole to the outside of the system.

In FIG. 3, numeral 20 is a reactor, and numeral 23 is an exhaust hole.

The features of the reactor of this type are that the evaporation area for reaction products can be made large and the increase in capacity is easy. The rotating plates may have flat surface, or may be provided with unevenness or projections, or may be in the multi-blade shape or screw shape.

Figure 4:
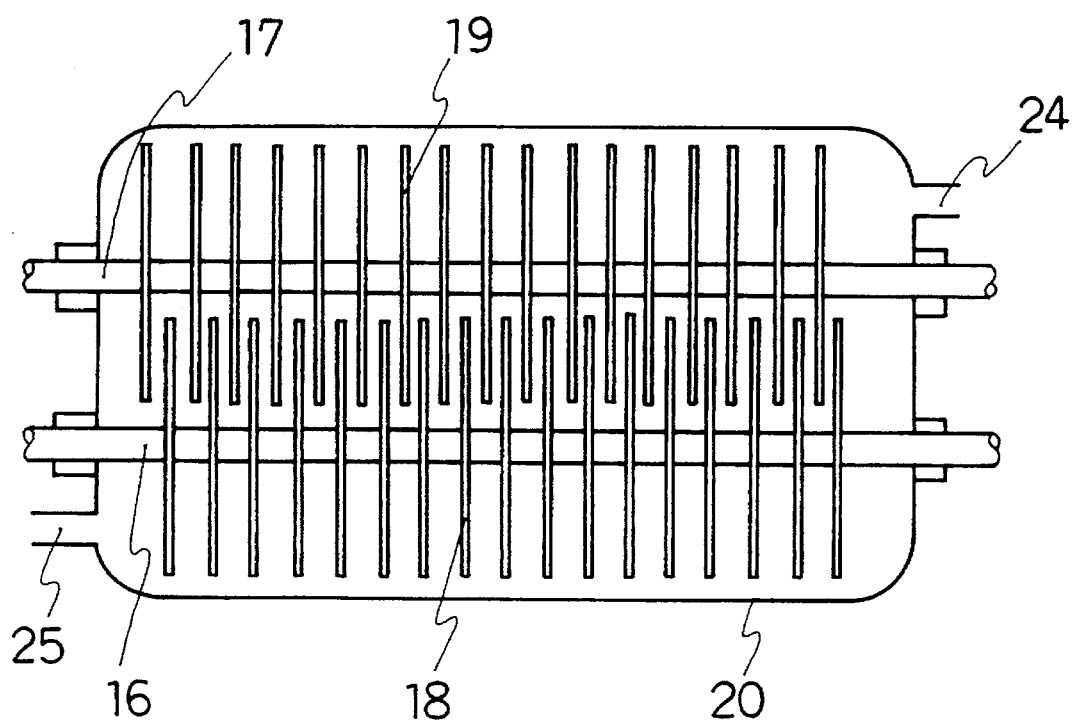
FIG. 4 is an illustrative plan view of a biaxial stirring reactor suitable for use in preparing the biodegradable copolyesters of the present invention.

FIG. 4 is an illustrative plan view of the above reactor. It would be clearly understood from the figure that a multiplicity of the rotating plates 18 and 19 attached to two driving shafts 16 and 17 are arranged in a mutually overlapping relation. The reaction products and the polymer are fed from inlet 24 on the right side by a liquid-sending pump or the like and sent out from outlet 25 on the left side by a pump or the like as needed. It is easy to control the feed amount by a signal of a level gauge in order to keep the liquid level constant.

The reactor 20 shown in FIG. 4 is of a horizontal type wherein the driving shaft is horizontally disposed, and the reaction products in the reactor transfer from the inlet 24 toward the outlet 25 by gravity or the like. A vertical type reactor wherein the driving shaft is vertically disposed, has the same agitating effect, but it is difficult to increase the evaporation area.

The rotating directions of the shafts of the biaxial kneader and the reactor equipped with biaxial agitator may be the same direction or the counter direction, but the rotation in the same direction is large in the agitation effect and the shearing force. In FIG. 3, there is shown an instance wherein the clearance between the rotating plates 18 and 19 and the reactor 20 is somewhat large, but it is possible to make this clearance narrow, to provide a constricted part in the center part of the section like FIG. 1, to make an upper space 22 large, to provide a hole for feeding additives, to conduct heating of reactor 20 by electric heating or heat medium, and to make various other applications.

In the preparation (continuous polymerization) of the copolyester (A), a plurality of the single screw extruder, the twin-screw kneader and the biaxial agitating type reactor can also be used in a manner of combining in multistage. For instance, a first twin-screw kneader can be used for conducting the melting, mixing, dehydration and initial polymerization of powdery or flake-like raw materials for polymerization (lactic acid, lactide, PEG, antioxidant, catalyst, additives and the like), and for the polymerization in the middle and final stages, second and third twin-screw kneaders or biaxial agitation type reactors connected thereto can be used for the polymerization in the middle and final stages, and a single screw extruder can be used in part.

The raw materials for polymerization can be previously, separately molten and fed to a polymerization apparatus respectively by measuring pumps.

In the above-mentioned continuous polymerization process, the polymerization is completed in less than 1 hour, especially 50 minutes, more especially 10 to 30 minutes, so the deterioration of the polymer can be minimized. Comparing with the before-mentioned Japanese Patent Publication Kokai No. 1-163135 wherein it is described that the polymerization time is from 1 to 10 hours and it takes a long time such as 215° C.×5 hours in Example 1, 195° C.×8 hours in Example 2 and 210° C.×6 hours in Example 3, it is understood that the polymerization time is very short. In particular, when the polymerization is carried out under a reduced pressure, the reaction rate can be further accelerated.

When a solvent is used, polymerization at low temperatures is possible whereby the polymer is prevented from deteriorating, but in industrial aspect it is disadvantageous in cost and safety.

Further, by copolymerizing PEG which is the component (A) in an amount of 0.1 to 15%, preferably 0.3 to 10%, the most preferably 0.5 to 8%, the obtained copolyester is remarkably improved in heat fluidity, so the polymerization procedures, particularly mixing, degassing and liquid sending, are become easy and the copolyester having uniformity and excellent quality is obtained. Also, the obtained copolyester is excellent in strength, whiteness, spinning property and drawing property.

It is preferable to use an antioxidant upon the preparation of the copolyester (A).

Since the PEG (A) is a chemically unstable compound easy to be oxidized, it is partially decomposed, so the product having a high degree of polymerization is hard to obtain, if the melt-copolymerization is carried out for a long time without using an antioxidant (in case of using no antioxidant, PEG is decomposed during the polymerization to generate aldehyde or the like). The decomposition can be prevented by adding about 10 to about 3,000 ppm, preferably 50 to 1,000 ppm, of an antioxidant to the polymerization system. The use of a too large amount of the antioxidant may hinder the polymerization, and at the time of polymerization it is desirable to use it in a necessary and minimum amount.

However, in order to raise the stability of the obtained articles, an antioxidant may be added and mixed in an amount of about 0.1 to about 3% at the time when the copolymerization has proceeded.

Hindered phenols, hindered amines and other known antioxidants are used as the antioxidant to be used during or after the polymerization. The addition rate is preferably from about 10 to about 30,000 ppm, especially 50 to 10,000 ppm.

Examples of the antioxidant are hindered phenols such as "Irganox" series antioxidants made by Ciba Geigy Corp., and hindered amines such as "Tinuvin" series antioxidants made by Ciba Geigy Corp., and examples of the ultraviolet absorber are benzotriazole compounds such as "Tinuvin" series ultraviolet absorbers made by Ciba Geigy Corp., and "Irgaphos" series ultraviolet absorbers which are mixtures of the benzotriazole ultraviolet absorbers with phosphite stabilizers. Similarly, "Sumilizer" series antioxidants which are phenol antioxidants made by Sumitomo Chemical Company, Limited, and "Sumisorb" which is a light stabilizer made by Sumitomo Chemical Company, Limited are also mentioned. As the antioxidants other than the above-mentioned, there can also be used thioether antioxidants and the like. Further, there are many cases that combination use of two or more of the above-mentioned stabilizers is preferable. Further, compounds having a large molecular weight, thus having a high boiling point or sublimation point, are preferred from the viewpoint of heat resistance. For example, with respect to the molecular weight, those having a molecular weight of not less than 500, especially not less than 700, are preferred. Irganox 1010 (molecular weight 1178) mentioned above is the most preferable example. Also, as the antioxidant and ultraviolet absorber there are preferred safe ones having no toxicity and no skin irritation.

Catalysts for polymerization reaction can be used upon preparing the copolyester (A).

As the catalysts, there can be used catalysts used for the polymerization of lactic acid and lactide, and catalysts used for the polymerization of polyesters. For example, as transesterification catalysts among the polymerization catalysts for polyesters, there are mentioned alcoholates of various alcohols with Na and Mg, carboxylates, carbonates, sulfonates and phosphates of Zn, Cd, Mn, Co, Ca, Ba, Sn and so on, oxides, hydroxides and halides of Mg, Pb, Zn, Sb, Ge and so on, and the like.

Upon selecting the catalyst, it is preferable to give consideration to discoloration of the product, side reaction or no formation of aggregated foreign matter, to say nothing of catalytic function.

The amount of the catalyst is usually from $10^{-3}$ to $10^{-6}$ mole/mole based on the amount of ester, and it is preferable to suitably select in accordance with the temperature and the reaction system.

With respect to the polymerization catalysts for polyesters, usual catalysts such as antimony trioxide and germanium oxide can be used. Also, in case of the reaction to obtain a lactide from lactic acid, zinc oxide, antimony trioxide and the like are well known, and in case of the polymerization reaction of the lactide, tetraphenyltin, stannous chloride, diethylzinc, tin octylate and the like are well known.

Of course, other catalysts than the above-mentioned can be utilized if they are excellent ones which are large in rate of reaction and cause less discoloration and side reaction.

In general, in case of subjecting the lactic acid component to a melt-polymerization, a part of the lactic acid component (such as lactic acid and lactide) tends to remain in the polymerization system in the unreacted state. If the remaining lactic acid component or a low molecular weight oligomer is present in the final products (such as molded articles, films, fibers, etc.), it serves as a sort of plasticizer, thus may bring about favorable things such as imparting a softness to the products. However, if the remaining low molecular weight compounds are present in excess, it may impair the quality of the products or may ooze out during the preparation steps or during the use to contribute troubles. For this reason, the amount of low molecular weight compounds (compounds having a molecular weight of not more than 500) remaining at the time of finishing the polymerization is preferably at most 20%, especially at most 10%, more especially at most 7%, further more especially at most 5%, the most especially at most 3%. For decreasing the remaining lactic acid component and low molecular weight compounds, it is also effective to remove them by raising the degree of vacuum in the middle to final stage of the polymerization, or to add and mix a polymerization initiator (alcohols such as ethylene glycol, glycerol, propylene glycol, PEG and polypropylene glycol also serve as the initiator) or a polymerization catalyst.

The polymer after the completion of the polymerization can be directly and immediately subjected to spinning or film formation, or can also be formed into molded articles, films or sheets, fibers and the like after once pelletizing it.

The spinning can be conducted by known methods such as melt spinning method, dry spinning method, wet spinning method, dry-wet spinning method and the like. Drawing, heat treatment, crimping and the like can also be carried out, as occasion demands. In particular, the melt spinning is preferable since it can be conducted at a high rate in a high efficiency.

In case of preparing films or the like, the film is formed by a melt extruding method, and it is subjected to stretching and heat treatment if needed.

Also, in case of preparing various molded articles, the molding can be conducted by melt extrusion, injection molding and the like.

The films prepared from the copolyester (A) show preferably a tensile strength of at least 20 kg/mm$^2$, and the fibers prepared from the copolyester (A) show preferably a tensile strength of at least 2 g/d.

The copolyester (A) of the present invention has a markedly excellent melt fluidity as compared with the homopolymers such as PLLA, and is excellent in applicability to partly oriented yarns (POY) prepared by high speed spinning at a spinning rate of at least 3,000 m/min., highly orientated yarns (HOY) prepared at a spinning rate of at least 4,000 m/min., spin-draw method (SPD) wherein the spinning and the drawing are continuously carried out, and step for Spun Bond non-woven fabric wherein spinning and forming into non-woven fabric are conducted simultaneously or subsequently. The copolyester (A) is greatly different in that a conventional PLLA homopolymer is remarkably inferior in applicability these high to efficient spinning methods. Similarly, the copolyester (A) of the present invention is also far superior to the conventional homopolymer in injection moldability to various containers and various parts, and film forming property and stretchability in the preparation of films.

Next, an explanation is given below with respect to copolyesters of the lactic acid component and the component (B) (hereinafter also referred to as "copolyester (B)").

With respect to the proportions of the lactic acid component and the component (B) in the copolyester (B), the proportion of the component (B) in the copolyester (B) is from 0.5 to 15% by weight, preferably 1.0 to 10% by weight. The higher the content of the component (B) (aliphatic polyester), the copolyester tends to become softer and to have a lower melting point. Therefore, it is not preferable to increase the content of the component (B) to too high level. For example, preferably the content of the component (B) is from 0.5 to 60% when the component (B) has a weight average molecular weight of 1,000, from 0.5 to 10.0% when the component (B) has a weight average molecular weight of 3,000, and from 0.5 to 12% when the component (B) has a weight average molecular weight of 6,000.

Since the copolyester (B) alters its hydrophilic property, rate of alkali hydrolysis, rate of biodegradation, elasticity such as Young's modulus and heat resistance such as melting point depending on the proportion of the component (B), as compared with polylactic acid homopolymer, it is preferable to select adequate molecular weight and proportion of the component (B) to be copolymerized.

Two or more of the component (B) having different molecular weights can be used in combination. In that case, like the case of the component (A), the average molecular weight of them is adopted as the molecular weight.

Also, from the viewpoint of excellent toughness of the molded articles (including films and fibers), it is preferable that the copolyester (B) has an average molecular weight of at least 50,000, especially at least 60,000, more especially from 80,000 to 300,000. Since the fluidity at the time of melting and the formability are poor if the average molecular weight is excessively large, the molecular weight (molecular weight calculated based on polystyrene by GPC measurement) is, from such points of view, at most 500,000, preferably not more than 300,000, more preferably 100,000 to 200,000.

Further, with respect to the manner of binding between the lactic acid component and the component (B) in the copolyester (B), in case that the both ends of the component (B) are hydroxyl groups or carboxyl groups, they are bonded in a manner like in the case of the copolyester (A) such that a group, e.g. carboxyl group, in the lactic acid component is condensed to a terminal group, e.g. hydroxyl group, of the component (B), and the lactic acid is successively condensed. Therefore, in that case, it is preferable for obtaining a high molecular weight to use a dicarboxylic acid component or a diol component as a third component like in the case of the copolyester (A).

On the other hand, in case that one terminal group of the component (B) is hydroxyl group and the other terminal group is carboxyl group, it reacts in the same manner as the lactic acid component and, therefore, random copolymer type or block copolymer type copolyesters (B) are obtained depending on how to react. In this case, a high molecular weight is obtained even if a dicarboxylic acid or diol component is not used.

Such copolyesters (B) have a melting point of at least 110° C. The higher the melting point, the more preferable for the same reason as in the case of the copolyester (A).

Next, an explanation is given below with respect to the component (B) constituting the copolyester (B). The explanation concerning the lactic acid component is omitted because of being the same as the case of the copolyester (A).

An aliphatic polyester which is the component (B) constituting the copolyester (B) comprehends a condensation product of a dicarboxylic acid and a diol through ester bonding, and a product of a hydroxy acid by self-condensation.

An example of the structure of the condensation product of dicarboxylic acid and diol by ester bonding among the components (B) is shown by the formula:

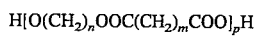

and preferably at least one terminal group has a hydroxyl group (OH).

In the above formula, n and m are usually 2 or more, preferably 2 to 12.

Also, p in the above formula is usually 10 or more, preferably 30 or more, more preferably 50 to 100. If p is less than 10, the heat resistance at the time of polymerization and the copolymerization proportions cannot be raised and the modification becomes insufficient. However, if p exceeds 200, it becomes difficult to conduct the polymerization uniformly since the viscosity at the time of the polymerization becomes high, and accordingly a variation in the physical properties of the obtained copolyester is easy to occur.

Examples of the acid component in the above formula are, for instance, organic dicarboxylic acids such as adipic acid, maleic acid and linoleic acid. Also, examples of the alcohol component are, for instance, organic diols such as ethylene glycol, propylene glycol, butylene glycol, hexane glycol, diethylene glycol and triethylene glycol. Further, as the aliphatic polyesters obtained from them, there are mentioned, for instance, polyethylene adipate, polyhexylene adipate, polypropylene adipate, polybutylene adipate, and the like.

In case of the aliphatic polyesters having hydroxyl groups at the both ends, the molar ratio of the hydroxyl group in the polymerization system increases in proportion to increase in the proportion of the aliphatic polyester to be copolymerized, and the molar ratio of carboxyl group/hydroxyl group deviates from 1. If so, the degree of polymerization in the polylactic acid unit does not sufficiently increase, resulting in production of only polymers having a small molecular weight and a weak strength.

Therefore, in case of using usual aliphatic polyesters having hydroxyl groups at the both ends as the component (B), it is preferable to add other dicarboxylic acids to the Polymerization system in order to bring the hydroxyl group/carboxyl group molar ratio in the Polymerization system near 1.

Also, as the alcohol component, there can be used an alcohol having a high molecular weight (number average molecular weight of not more than 20,000, preferably 2,000 to 10,000) such as polyethylene glycol, polypropylene glycol, polybutylene glycol, polyethylene triol, polypropylene triol, or Polypropylene-polyethylene triol. Further, there can be used a product prepared by addition of ethylene oxide to a polyhydric alcohol having a tri or more valency as used in the copolyester (A).

The copolyesters with an aliphatic polyester having a branch tend to have enhanced impact resistance and heat stability. Also, the presence of the aliphatic polyester component different from the lactic acid component in the molecular chain enables to control the crystallinity and biodegradability. In case of the aliphatic polyester containing a lactic acid component, the efficiency of initiator is increased, thus it is possible to obtain a uniform lactic acid polymer having a higher molecular weight.

Also, in case that the other end group is carboxyl group, there is the advantage that the carboxyl group/hydroxyl group ratio in the polymerization system does no change even if lactic acid is copolymerized with an optional amount of the aliphatic polyester, thus the degree of polymerization is not lowered.

The aliphatic polyester having a hydroxyl group at one end and carboxyl group at the other end can be prepared by self-condensation of a hydroxy acid or by condensation of the above-mentioned dicarboxylic acid and diol.

The component (B) having carboxyl groups at the both ends can be obtained by raising the proportion of the dicarboxylic acid in the above-mentioned condensation of dicarboxylic acid and diol.

The self-condensation products of hydroxy acids among the components (B) include products obtained by ring opening of a cyclic lactone onto an alcohol. Thus, the aliphatic polyester comprehends those obtained by addition of a cyclic lactone to a starting material for causing the ring-opening of the cyclic lactone, e.g., water or ethylene glycol, bisphenol A, an alkylamine having a $C_1$ to $C_{20}$ alkyl group, or a tri- or more valent compound such as glycerol, trimethylolpropane, pentaerythritol, sorbitol or castor oil. For instance, in case of the aliphatic polyester having a branch, the impact resistance and the heat resistance are improved.

Examples of the cyclic lactone are cyclic dimers of α-hydroxycarboxylic acids other than lactic acid, a cyclic dimer of glycolic acid (glycollide), caprolactones, glucono-1,5-lactone, and the like.

The molecular weight of the aliphatic polyester (B) is usually at least 1,000, preferably at least 1,500, more preferably 1,500 to 20,000, in terms of weight average molecular weight.

In case that the molecular weight of the component (B) is lower than 1,000, it is necessary to increase the proportion of the aliphatic polyester copolymerized upon modification. In this case, the lowering of the crystallinity of PLLA is marked, and lowering of the strength and heat resistance and increase of discoloration are easy to occur, thus favorable.

On the other hand, if the molecular weight of the component (B) exceeds 20,000, oxidation of the obtained copolyester (B) is easy to occur, and fiber strength and a color are easy to change with the lapse of time, thus unfavorable.

Explanation of the process for preparing the copolyester (B) is omitted, since the apparatus, procedure, optionally used antioxidant and catalyst, and the like are the same as the case of copolyester (A) except that the component (A) used in the preparation of the copolyester (A) is substituted by the component (B).

Also, the molding process and uses of the copolyester (B) are the same as the case of the copolyester (A) and, therefore, the explanation thereof is omitted.

Next, an explanation is given below with respect to the copolyesters of the lactic acid component and the component (C) (hereinafter also referred to as "copolyester (C)").

With respect to the proportions of the lactic acid and the component (C) in the copolyester (C), the proportion of the component (C) in the copolyester (C) is 0.5 to 20% by weight, preferably 1 to 20% by weight, more preferably 2 to 15% by weight, still more preferably 3 to 10% by weight. The higher the content of the component (C), the crystallinity is much lowered to decrease the fragility and to increase the impact resistance (first effect).

Further, an important change in physical properties by introduction of the component (C) is an increase in the rate of degradation (second effect). The degradation rate is also produced by the lowering of the crystallinity resulting from copolymerization, but it is assumed that further effect based on the hydrophilic property of the sulfo group is particularly large. In both cases, the alkali metal salts (sodium salt, potassium salt, etc.) of sulfo group exhibit more marked effect than sulfo group itself.

The third effect of the introduction of the component (C) is an improvement in the dyeing property. The polylactic acid is dyeable with a disperse dye, but is poor in color fastness (migration phenomenon of dye owing to wet friction and heating). Thus, the improvement has been desired for use as clothes and non-cloth fibers. Vivid dyeing with basic dyes is enabled and color fastness is improved by the introduction of sulfo group.

The molecular weight of the copolyester (C) is at least 50,000, preferably 60,000 to 300,000, more preferably 80,000 to 200,000, in terms of average molecular weight. If the average molecular weight is less than 50,000, the fibers, films and molded articles lack in strength. Since the melt viscosity is increased by the introduction of sulfo group, copolyesters having a relatively low molecular weight (50,000 to 80,000) can also be used.

The copolyester (C) contains the lactic acid as a main component, namely 99.5 to 80%, preferably 80 to 99%, more preferably 85 to 98%, still more preferably 90 to 97%, of the lactic acid component. The lactic acid component comprehends those derived from L-lactic acid, D-lactic acid, and an L/D-lactic acid mixture. Since an L/D-copolymer generally lowers crystallinity and heat resistance, a polymer of either one of optically active monomers is preferable. In case of being mainly composed of the L-form, it is desirable that the content of the L-form is usually not less than 80% (not more than 20% of the D-form), preferably not less than 90%, more preferably not less than 95%. Similarly, in case of being mainly composed of the D-form, it is desirable that the content of the D-form is usually not less than 80%, preferably not less than 90%, more preferably not less than 95%.

Next, an explanation is given below with respect to the component (C).

The component (C) is a sulfo group-containing ester-forming compound represented, for instance, by the formula (I):

$$X^1-A-X^2 \atop | \atop SO_3M \qquad (I)$$

wherein $X^1$ and $X^2$ are an ester-forming group, A is a trivalent aromatic group, and M is a metal atom or a hydrogen atom; or by the formula (II):

$$X^1-A-X^2 \atop | \atop SO_3^-[PR^1R^2R^3R^4]^+ \qquad (II)$$

wherein $X^1$ and $X^2$ are an ester-forming group, A is a trivalent aromatic group, P is a phosphorus atom, and $R^1$, $R^2$, $R^3$ and $R^4$ are an alkyl group having 1 to 15 carbon atoms or an aryl group having 6 to 20 carbon atoms.

Examples of the compound (I) are, for instance, a metal-sulfonated benzene dicarboxylic acid or its alkyl ester (alkyl group having 1 to 15 carbon atoms) such as sodium 5-sulfoisophthalate, dimethyl sodium 5-sulfoisophthalate, potassium 5-sulfoisophthalate, dimethyl potassium 5-sulfoisophthalate, diethyl potassium 5-sulfoisophthalate, lithium 5-sulfoisophthalate, dimethyl lithium 5-sulfoisophthalate or sodium 2-sulfoterephthalate; a metal-sulfonated naphthalene dicarboxylic acid, its alkyl ester (alkyl group having 1 to 15 carbon atoms) or its ester with a lower diol having 2 to 8 carbon atoms, such as sodium 4-sulfo-2,6-naphthalene dicarboxylic acid, dimethyl sodium 4-sulfo-2,6-naphthalene dicarboxylic acid, sodium 4-sulfo-1,4-naphthalene dicarboxylic acid or sodium 5-sulfo-1,4-naphthalene dicarboxylic acid; and the like.

Examples of the compound (II) are, for instance, tetrabutylphosphonium 3,5-dicarboxybenzenesulfonate, ethyltributylphosphonium 3,5-dicarboxybenzenesulfonate, benzyltributylphosphonium 3,5-dicarboxybenzenesulfonate, phenyltributylphosphonium 3,5-dicarboxybenzenesulfonate, tetraphenylphosphonium 3,5-dicarboxybenzenesulfonate, butyltriphenylphosphonium 3,5-dicarboxybenzenesulfonate, benzyltriphenylphosphonium 3,5-dicaboxybenzenesulfonate, tetrabutylphosphonium 3,5-dicarbomethoxybenzenesulfonate, ethyltributylphosphonium 3,5-dicarbomethoxybenzenesulfonate, tetraphenylphosphonium 3-carboxybenzenesulfonate, their alkyl esters (alkyl group having 1 to 15 carbon atoms), their esters with a lower diol having 2 to 8 carbon atoms, and the like.

One kind of, or two or more kinds of the sulfo group-containing ester-forming compound represented by the formula (I) or (II) may be included in the copolyester (C). Preferable examples of the sulfo group-containing ester-forming compound are 5-sulfoisophthalic acid, 5-sulfoterephthalic acid, their salts with an alkali metal or the like (for example, potassium, sodium, lithium, ammonium, an alkylphosphonium, etc.), their esterification products wherein their carboxyl groups at the both ends are esterified with a lower diol having 2 to 4 carbon atoms such as ethylene glycol or propylene glycol.

The copolyester (C) contains the lactic acid component as the main component and the component (C) as the comonomer component, and it may further contain known diols or dicarboxylic acids as the third component.

Examples of the above-mentioned diols are, for instance, ethylene glycol, propylene glycol, butanediol, hexanediol, octanediol, decanediol, cyclohexanediol, diethylene glycol, triethylene glycol, and the like.

In particular, if the diols are linear diols having 6 or more carbon atoms, they may contain a branched chain, but preferably the size of the branched chain is one having 3 or less carbon atoms and the number of branched chains is 2 or less since lowering in strength and heat resistance of the obtained fibers is brought about if the crystal structure of the fibers is disturbed excessively.

Also, the strength and heat resistance of the obtained fibers are also lowered if the number of carbon atoms of the linear diols is too large and, therefore, the number of carbon atoms of the linear chain is preferably at most 15, more preferably at most 12. Also, an unsaturated bond may be included in the carbon chain.

Examples of the above-mentioned dicarboxylic acids are succinic acid, adipic acid, sebacic acid, decanedicarboxylic acid, terephthalic acid, isophthalic acid and other dicarboxylic acids.

In particular, difunctional carboxylic acids having 6 or more carbon atoms may contain a branched chain if the number of carbon atoms of linear chain is 6 or more. However, if the crystal structure of fibers is disturbed excessively, it causes lowering in the strength and heat resistance of the fibers, and for this reason, the size of the branched chain is preferably that the number of carbon atoms is 3 or less, and the number of branched chains is preferably 2 or less.

Also, the strength and heat resistance of the obtained fibers are also lowered if the number of carbon atoms of the linear chain is too large. Thus, the number of carbon atoms of the linear chain is preferably at most 15, more preferably at most 12.

Examples of such a difunctional carboxylic acid are a saturated aliphatic dicarboxylic acid such as adipic acid, azelaic acid or sebacic acid, and an unsaturated aliphatic dicarboxylic acid such as fumaric acid or citraconic acid.

A cyclic carboxylic acid such as caprolactone, pivarolactone or octanolactone can also be used.

The process for preparing the copolyester (C) is explained below.

It is fairly difficult to copolymerize the lactic acid component with not less than 0.5% of sulfoisophthalic acid based on the lactic acid component, since sulfo group (particularly metal salt thereof) is hygroscopic and the water content is high and, therefore, contamination of the polymerization system of lactic acid component with water causes hydrolysis of the polymer, so no high degree of polymerization is obtained.

However, if other aliphatic polyester-forming components having a relatively high stability and sulfoisophthalic acid are previously reacted in a sufficiently dehydrated state (vacuum) and the obtained prepolymer (oligomer or polymer) containing sulfo group (less water) is reacted with the lactic acid component, the copolymerization can be achieved relatively easily.

In case of this method, it is preferable that the both end groups or one end group of the sulfo group-containing prepolymer molecule is hydroxyl group. For this purpose, it is desirable that, in the synthesis of the sulfo group-containing prepolymer by esterification, the molar ratio of carboxyl group and hydroxy group is equimolar ratio or the hydroxyl group is excess by about 0.1 to about 30%.

The sulfo group-containing prepolymer and the lactic acid component can be polymerized in a solvent, but the melt polymerization is the most efficient. In case of the melt polymerization, the lactic acid component is polymerized at a temperature of not more than about 220° C. (if the temperature is too high, a decomposition reaction is accelerated). Therefore, it is preferable that the prepolymer has a melting point of not more than 220° C., especially not more than 200° C.

The sulfo group-containing prepolymer can be obtained by subjecting the sulfo group-containing ester-forming compound (I) or (II) to esterification with a lower diol having 2 to 4 carbon atoms such as ethylene glycol, propylene glycol or diethylene glycol, and/or by subjecting this esterification product to condensation. For example, the prepolymer having the lowest molecular weight is a reaction product of one molecule of the sulfo group-containing compound with two molecules of the diol, and examples thereof are, for instance, bishydroxyethyl sulfoisophthalate, bishydroxybutyl sulfoisophthalate, bishydroxyhexyl sulfoisophthalate, and the like. If dehydration is sufficiently conducted, it is also possible to react lactic acid with a lactide.

The reaction product of two molecules of the sulfo group-containing ester-forming compound with 3 molecules of the diol is an oligomer which is an example of the above-mentioned prepolymers. The weight average molecular weight of the prepolymer is from 700 to 30,000, especially 1,000 to 20,000, more especially 1,000 to 10,000. The weight proportion of the above-mentioned sulfo group-containing compound in the prepolymer is usually from 10 to 80%, preferably 30 to 60%.

For instance, in case that the hydroxyl groups at the both ends of a prepolymer having a weight average molecular weight of 10,000 and containing 40% of a sulfo group-containing ester-forming compound serve as a polymerization initiating sites and a lactide is polymerized, assuming that the molecular weight of each of the polylactide (polylactic acid) portions is 80,000, the molecular weight of the entire is 170,000 and the content of the sulfo group-containing compound becomes 2.4%. Similarly, if the molecular weight of the polylactide portion is 40,000, the molecular weight of the entire is 90,000 and the content of the sulfo group-containing compound becomes 4.4%.

The copolyester (C) Can be prepared by reacting the lactic acid component with a compound containing the sulfo group-containing ester-forming compound and having 2 ester-forming functional groups (hydroxyl group, carboxyl group or the like) per molecule. As mentioned above, a prepolymer obtained by reacting sulfoisophthalic acid with other polyester-forming material is particularly preferred as the compound containing the sulfo group-containing ester-forming compound and having 2 ester-forming functional groups. In order to obtain the copolyester having a higher molecular weight, to the raw materials for the polymerization may be further added a slight amount (not more than 1%) of a trifunctional component (a triol such as glycerol, hydroxy glutalic acid or benzene triol; a terminal-esterification product of a tricarboxylic acid such as trimellitic acid with ethylene glycol, etc; and the like).

The polymerization may be carried out by a melt polymerization method or a solvent method using a solvent, but there are many cases where the melt polymerization method is better from the viewpoints of safety and efficiency.

Batchwise type and continuous type reactors capable of conducting heating, agitation, pressure reduction or the like can be used as a polymerization vessel used in the preparation of the copolyester (C). In case of carrying out the polymerization of the lactic acid component by a thermal polymerization of lactide, a twin-screw heading extruder equipped with a vent, which effectively achieves heating, agitation and sending of reaction products and also can achieve pressure reduction, is advantageous, and a plurality thereof may be connected in series as occasion demands.

Upon the preparation of the copolyester (C), there may be incorporated and mixed, as occasion demands, above-mentioned or the like catalyst, antioxidant, ultraviolet absorber, lubricant, pigment, colorant, inorganic particles, antistatic agent, releasing agent, and well-known other organic and inorganic additives and fillers.

The preparation of the copolyester (C) using the twin-screw kneading extruder equipped with a vent or the like apparatus can be made in the same manner as the case of the copolyester (A) by using the component (C) instead of the component (A) used in the preparation of the copolyester (A), preferably by using a prepolymer containing the component (C).

Also, since the molding process and uses of the prepared copolyester (C) are the same as the case of the copolyester (A), the explanation thereof is omitted.

The molded articles of the present invention will be explained below.

The molded articles of the present invention are those prepared by melt-molding the biodegradable copolyesters of the present invention as mentioned above.

Examples of the above-mentioned molded articles are, for instance, a conjugate fiber composed of (a) a biodegradable (co)polyester having a melting point Ta used gin melt-adhesive polylactic acid fibers or the like [hereinafter also referred to as "(co)polyester (a)"; the term "(co)polyester" meaning both a polyester and a copolyester], and (b) a biodegradable (co)polyester [hereinafter also referred to as "(co)polyester (b)"] which has a melting point lower than Ta by at least 10° C. or which is amorphous and has no melting point [hereinafter also referred to as "molded article (I)"]; a molded article comprising a sheath and a core, wherein the sheath is made of a less degradable copolyester that the rate of degradation by biodegradation or by hydrolysis in neutral water or aqueous solution is low, and a core is made of a biodegradable copolyester having a rate of degradation of at least 2 times the rate of degradation of the above-mentioned sheath, and both the core component and the sheath component are molecular-orientated [hereinafter also referred to as "molded article (II)"]; a conjugate fiber composed of the above-mentioned biodegradable copolyester and a fiber-forming copolyester containing at least 40% of a component derived from an aromatic compound, wherein the fiber-forming copolyester is separated by the biodegradable copolyester into a plurality of segments in the transverse section of the monofilament, at least a part of the fiber surface is occupied by the biodegradable copolyester, and the conjugate fiber is dividable [hereinafter also referred to as "molded article (III)"]; and the like.

As the (co)polyester (a) in the molded article (I), there is preferred a polylactic acid polymer containing at least 80% of L-lactic acid units or D-lactic acid units (including the biodegradable copolyester of the present invention).

It is known that optical isomers, D-form and L-form are present in lactic acid. If the both are copolymerized, the melting point is lowered, and if the optical purity is not so high, the product becomes an amorphous polylactic acid which no longer show a melting point. The optical purity (proportion of the D-form or L-form) of the lactic acid units in the (co)polyester (a) is preferably at least 80% by mole, more preferably at least 95% by mole, still more preferably at least 98% by mole.

In contrast, as the (co)polyester (b) (which can be the biodegradable copolyester of the present invention) used in the molded article (I), crystalline one having a melting point Tb is preferred in that the heat resistance is superior, but amorphous one having no melting point may be used. In case that the (co)polyester (b) has a melting point Tb, the melting point Tb is a temperature lower than the above-mentioned melting point Ta by at least 10° C., and the difference in melting point between them is preferably from 10° to 80° C., more preferably 30° to 60° C.

The copolyester (b) which has a low melting point or is amorphous, is obtained by a method wherein the optical purity of the lactic acid units in the copolyester (b) is controlled. That is to say, if the optical purity is lowered, copolyesters having a low melting point are obtained, and amorphous ones can be obtained by further lowering the optical purity.

In general, L-form is produced when lactic acid is manufactured by a fermentation method, and for industrial purposes L-lactic acid is easy to obtain inexpensively in a large quantity rather than D-lactic acid. Accordingly, the polylactic acid-based (co)polyesters of the present invention are usually those mainly made of L-lactic acid. However, with respect to polymers mainly made of D-lactic acid too, those having similar physical properties to the case of L-lactic acid can be obtained.

As the (co)polyester (a) and/or the (co)polyester (b) used in the molded articles (I), there can also be used polylactic acid-based copolymers produced by copolymerization of lactic acid and polyethylene glycol (PEG) having a number average molecular weight of at least 300. In this case, the content of polyethylene glycol in the copolymers is preferably from about 0.1 to about 15%.

Also, the (co)polyester (a) and/or the (co)polyester (b) may be copolymerization products containing preferably 0.1 to 15%, more preferably 0.1 to 10%, still more preferably 0.5 to 7%, of a compound having a plurality of functional groups, e.g., a polyhydric aliphatic alcohol (such as ethylene glycol, propylene glycol, butanediol, hexamethylenediol, glycerol, trimethylolpropane, penthaerythritol, sorbitol or castor oil), a polyhydric alicyclic alcohol (such as cyclohexanediol, cyclohexanedimethanol, cycloheptanediol or cycloheptanedimethanol), an aliphatic polycarboxylic acid (such as adipic acid, sebacic acid, decanedicarboxylic acid, citric acid, glutamic acid or aspartic acid), an alicyclic polycarboxylic acid (such as cyclohexanedicarboxylic acid, cycloheptanedicarboxylic acid, cyclooctanedicarboxylic acid or cyclododecanedicarboxylic acid), an aliphatic hydroxycarboxylic acid (such as L-lactic acid, D-lactic acid, glycolic acid, ε-hydroxycaproic acid, 3-hydroxybutyric acid, 4-hydroxybutyric acid, hydroxystearic acid, recinoleic acid, malic acid or serine), an alicyclic hydroxycarboxylic acid, or an aromatic hydroxycarboxylic acid (such as hydroxybenzoic acid); a lactone (such as lactide, glycollide, caprolactone or gluconic lactone); a cyclic compound such as a cyclic ether; and the like. By introducing these polyfunctional compounds or cyclic compounds, the fluidity of copolyesters in melt spinning is improved, so it is possible to contemplate an improvement in spinning property, spinning workability and quality.

In the present invention, in order to obtain good-quality fibers having a uniformity and a high strength, the molecular weight of the (co)polyester (a) is preferably not less than 50,000, more preferably not less than 100,000, further more preferably not less than 150,000. Further, in order to form into uniform fibers and uniform fiber articles, the difference in the molecular weight between the (co)polyester (a) and the (co)polyester (b) is preferably not more than 50,000, more preferably not more than 30,000. If the difference in the molecular weight between the (co)polyester (a) and the (co)polyester (b) exceeds 50,000, there is a tendency of lacking in molding stability such as spinning stability, so the quality of the obtained shaped articles such as fibers becomes easy to fluctuate, thus the variation becomes large to produce a possibility of impairing the commercial value.

In case that the molded article (I) is a conjugate fiber having a multi-layer structure of the (co)polyester (a) and the (co)polyester (b), examples of its structure in the transverse section are, core-sheath type, parallel type (side-by-side type), multi-core type, multi-parallel type (stripe type), concentric circle type, eccentric circle type, and radial type structures. In any of the transverse sectional structures, the conjugate fiber has a structure such that the (co)polyester (b) comes out to the fiber surface at least a part of the fiber surface. If the (co)polyester (b) does not appear at the fiber surface, the heat welding property is not exhibited, so the objects of the present invention cannot be achieved. Therefore, in case of the conjugate fiber of core-sheath structure in transverse section, the core portion is made of the (co)polyester (a) and the sheath portion is made of the (co)polyester (b).

The proportion of the portion made of the (co)polyester (a) in the above-mentioned conjugate fiber is preferably not less than 50%, more preferably not less than 60%, still more preferably not less than 70%, and it is desirable that the proportion is not more than 95%. The conjugate fibers as mentioned above are prepared usually by conducting a melt spinning through special spinning nozzles designed to give respective transverse section structure.

A non-woven fabric can be obtained by subjecting the molded article (I) (a heat weldable polylactic acid fiber) to entwinement into a non-woven fabric form, and heating it by an embossing machine under pressure at a temperature which is higher than the melting point of the (co)polyester (b) if the (co)polyester (b) has a melting point, and is lower than the melting point of the (co)polyester (a), whereby the (co)polyester (b) is fused while the (co)polyester (a) keeps its original shape, and is fused together with the (co)polyester (b) of adjacent other fibers.

Now referring to the molded article (II), the conjugate fibers in the molded article (II) are those prepared by a method wherein a plurality of components are spun out with being joined together at the time of spinning to form a single filament. The core-sheath conjugate fiber has a composite structure such that a core component (polymer) is completely covered with a sheath component (polymer).

FIGS. 5 to 11 are illustrative transverse sectional views of single fibers showing various instances of a core-sheath conjugate fiber which is one of the molded articles (II).

In FIGS. 5 to 11, numeral 26 is a sheath made of a slightly degradable (co)polyester, and numerals 27, 27A and 27B are a core made of an easily degradable (co)polyester (which may be the biodegradable copolyester of the present invention). Numeral 28 is a hollow portion.

The less degradable (co)polyester used in the sheath portion of the molded article (II) can be selected in general from polyesters having the features such that (1) the purity is high, (2) the regularity and crystallinity of structure are high, and (3) the content of an aromatic component is higher. Its half-life (period until the tensile strength of a fiber becomes ½) is usually within the range of about 1 month to about 10 years, and the most commonly used half-life is from 1 to 5 years.

As the less degradable (co)polyester for use as the sheath component, useful is a homopolymer containing no impurity (comonomer and mixture) such as poly(L-lactic acid), poly(D-lactic acid), poly(L-hydroxybutyrate), poly(D-hydroxybutyrate) or the like, or a modified product of which impurity content is small (less than 3%). Similarly, there is also useful a copolymerization product of a small amount, e.g. 3 to 30%, of an aliphatic polyester component as a degradable component with a copolyester wherein a third component such as isophthalic acid is introduced into an aromatic polyester such as polyethylene terephthalate (hereinafter referred to as "PET"), polybutylene terephthalate (hereinafter referred to as "PBT") or polyhexaneterephthalate (hereinafter referred to as "PHT").

Examples of the aliphatic polyester component used in the above-mentioned less degradable (co)polyester are (1) a combination of an aliphatic glycol (e.g. ethylene glycol, propylene glycol, butylene glycol, hexanediol, octanediol or decanediol) and an oligomer of ethylene glycol (e.g. diethylene glycol or triethylene glycol) with an aliphatic dicarboxylic acid (e.g. succinic acid, adipic acid, hexanedicarboxylic acid or decanedicarboxylic acid), (2) a lactone (e.g. caprolactone or pivalolactone) and (3) a hydroxycarboxylic acid (e.g. lactic acid, butyric acid or valerianic acid), and also, for instance, polylactic acid, polyhydroxybutyrate, polyethylene adipate, polybutylene adipate, polyhexane adipate, polycaprolactone and copolymers containing them.

Another example of the slightly degradable (co)polyester for the above-mentioned sheath component is a material wherein the degradability is decreased by incorporating a water repellent component.

Examples of the water repellent component are a paraffin (liquid paraffin, natural paraffin, etc.), a wax (microcrystalline wax, etc.), a higher fatty acid ester (butyl stearate, castor oil, ethylene glycol monostearate (fatty acid glycol ester), etc.), an amide wax (stearic acid amide, palmitic acid amide, methylenebisstearoamide, ethylenebisstearoamide, oleic acid amide, etc.), a higher fatty acid metal salt (stearic acid salt, lauric acid salt, etc., particularly calcium salt, magnesium salt, zinc salt, etc.), polyethylene (weight average molecular weight not more than 20,000, especially not more than 10,000 and not less than 2,000), polyethylene wax (molecular weight of 1,500 to 2,000, etc.), silicone oil, silicone wax, and the like.

The mixing rate of the water repellent component is from about 0.1 to about 5%, and in particular there are many cases where a range of 0.2 to 3% is preferable.

The slightly degradable (co)polyesters for sheath use are advantageously to be subjected to a melt composite spinning with the core component from the viewpoints of quality, properties and cost. Therefore, those having a melting point (and melt viscosity) close to the melting point (and melt viscosity) of the easily degradable (co)polyester for core use are desirable. That is to say, it is desirable that the melting point of the sheath component is from 100° to 220° C., especially 120° to 200° C.

In case of using an aliphatic polyester such as polylactic acid or polyhydroxybutyrate as the slightly degradable (co)polyester for sheath use, the higher the molecular weight and regularity in molecular structure of the aliphatic polyester which is unmodified (homopolymer), the higher the crystallinity and the lower the rate of degradation. Similarly, the rate of degradation can be decreased by drawing at a high draw ratio to raise the degree of orientation and the degree of crystallization, or by subjecting to a heat treatment to raise the degree of crystallization. Conversely, if the regularity in molecular structure is decreased to lower the crystallinity by copolymerizing or mixing with second and third components, the rate of degradation is increased.

As stated above, it is possible to control the rate of deterioration of the sheath component within a wide range by changing (1) the composition of the polymer, particularly the ratio of the aliphatic component and the aromatic component, (2) adding the water repellent component, or (3) factors such as crystallinity. For example, by changing the half-life of the sheath component embedded in the soil such as 2 weeks, one month, 3 months, 6 months, 1 year, 2 years, 5 years or 10 years, the life (application limit period) of the conjugate fibers can be adjusted in a wide range and it is possible to apply them to various uses.

On the other hand, with respect to the easily degradable (co)polyesters for use in the core component of the molded articles (II), those having a rate of degradation faster than that of the sheath component (rate of degradation of at least 2 times) are selected generally from (1) a non-modified aliphatic polyester, (2) a copolyester or mixture containing an aliphatic polyester as the main component and (3) an aromatic polyester copolymerized or mixed with an aliphatic polyester so as to impart a degradability thereto.

For core use, it is easy to lower the regularity in molecular structure of the polymer by copolymerization or mixing with the second and third components or in a like manner in order to raise the rate of degradation. For example, it is possible to remarkably lower the crystallinity of an aliphatic polyester such as poly-L-lactic acid or poly-L-hydroxybutyrate or to make it amorphous by copolymerization with 1 to 50%, especially 3 to 20%, of an optically active isomeric monomer (D-form). Similarly, the crystallinity can also be remarkably reduced by introducing a different kind of an aliphatic component or an aromatic component by means of copolymerization. Similarly, the crystallinity can also be easily reduced by mixing with 1 to 50%, especially 3 to 20%, of an oligomer of the same or different kind of monomer, or a different kind of polymer.

In general, the degradability of a polymer tends to be increased if the polymer is made hydrophilic, and tends to be decreased if the polymer is made hydrophobic. The process for reducing the degradability by mixing a water repellent component has been explained in the above-mentioned item concerning a means for reducing the rate of degradation of the sheath component. Conversely, the rate of degradation of polymers can be increased by introducing a hydrophilic component. For example, the rate of degradation of polymers can be increased by copolymerization or mixing with a compound having amino group, imino group, amido bond, hydroxyl group, sulfo group, phosphoric acid group or ether bond. For example, it is possible to raise the rate of degradation by copolymerization with about 0.5 to about 30% of sulfoisophthalic acid or a polyether, especially polyethylene glycol. Similarly, it is possible to raise the rate of degradation by mixing with about 0.5 to about 30% of a polysuccharide or a polyamino acid.

Similarly, the rate of degradation of polyesters can be raised by copolymerization or mixing with about 0.5 to about 30% of a component having a low glass transition temperature (Tg), e.g., a component having a Tg of not more than 20° C., especially not more than 0° C., (for example, polycaprolactone, polyhexane adipate, polyalkylene ether, or the like).

As stated above, it is possible to control the rate of degradation of the core component within a wide range by changing (1) the composition of the polymer, particularly the ratio of the aliphatic component and the aromatic component, or (2) factors such as crystallinity, or by introducing (3) a hydrophilic component or (4) a component having a low Tg. For example, by changing the half-life of the sheath component embedded in the soil such as one week, 2 weeks, one month, 2 months, 6 months, 1 year or 2 years, the deterioration performances after exceeding the term of validity can be adjusted in accordance with the purpose of application. The half-life of the core component varies depending on the purposes, but there are many cases that a half-life of not more than 6 months, especially not more than 3 months, more especially 1 to 3 months, is preferable. However, if the core component is easy to be degraded too much, a care should be taken since the core may be degraded prior to breakdown of the sheath by water or the like penetrating through the sheath.

The (co)polyesters used in the sheath and the core of conjugate fibers which are the molded article (II) may contain, as occasion demands, antioxidant, ultraviolet absorber, lubricant, pigment, colorant, antistatic agent, releasing agent, and other well-known additives and fillers.

Figure 5:
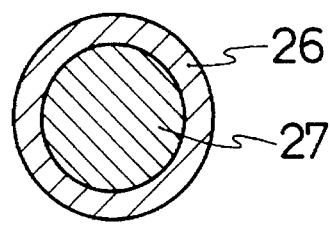
FIG. 5 is an illustrative transverse sectional view of an example of a core/sheath type conjugate fiber which is one of the molded articles of the present invention.
Figure 6:
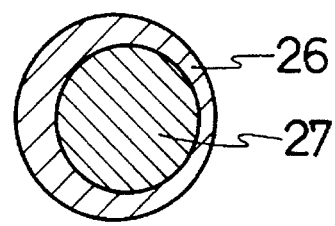
FIG. 6 is an illustrative transverse sectional view of a further example of a core/sheath type conjugate fiber which is one of the molded articles of the present invention.
Figure 7:
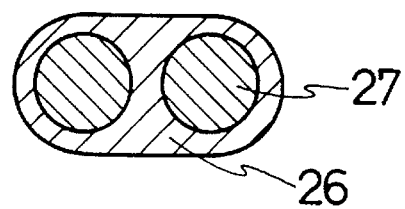
FIG. 7 is an illustrative transverse sectional view of a still further example of a core/sheath type conjugate fiber which is one of the molded articles of the present invention.
Figure 8:
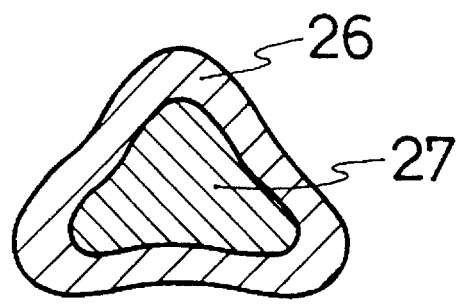
FIG. 8 is an illustrative transverse sectional view of another example of a core/sheath type conjugate fiber which is one of the molded articles of the present invention.
Figure 9:
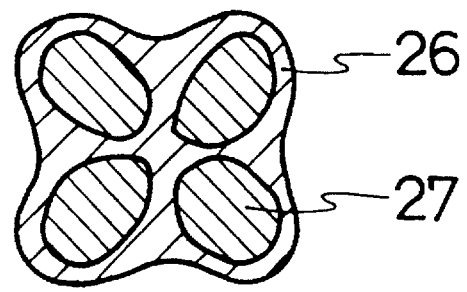
FIG. 9 is an illustrative transverse sectional view of still another example of a core/sheath type conjugate fiber which is one of the molded articles of the present invention.
Figure 10:
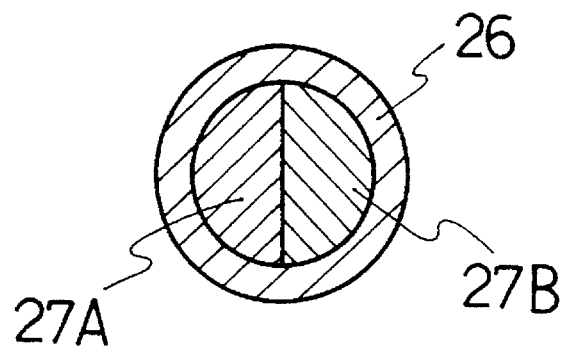
FIG. 10 is an illustrative transverse sectional view of a further example of a core/sheath type conjugate fiber which is one of the molded articles of the present invention.
Figure 11:
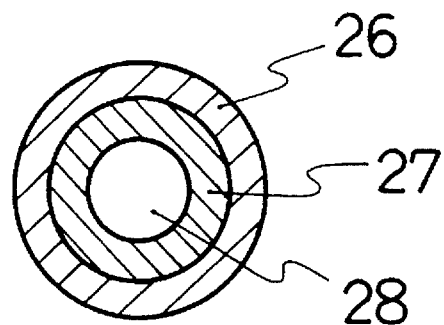
FIG. 11 is an illustrative transverse sectional view of a still further example of a core/sheath type conjugate fiber which is one of the molded articles of the present invention.

FIGS. 5 to 11 are views for illustrating concrete examples of the transverse section of conjugate fibers, any of which are the molded article (II). FIG. 5 shows an example of a concentric circle type, FIG. 6 shows an example of an eccentric type, FIG. 7 shows an example of a double core type, FIG. 8 shows an example of a non-circular type, FIG. 9 shows an example of a multi-core deformed shape type, FIG. 10 shows an example wherein two kinds of easily degradable (co)polyesters (2A) and (2B) integrally form a core, and FIG. 11 shows an example of a hollow type. That is to say, the conjugate fibers in the molded articles (II) may have any of structures such as concentric structure, eccentric structure, single core structure and multi-core structure. The shape of the section can also be suitably selected, such as circle, non-circle (ellipse, polygon, multi-blade shape, star shape, C-shape, I-shape, H-shape, L-shape, W-shape, cocoon shape, and similar shapes thereto) and hollow shape.

The sheath/core ratio (sectional area ratio or volume ratio) of the conjugate fiber in the molded article (II) is selected in accordance with the purposes and uses. Preferably, the ratio is from 2/1 to 1/20, especially from 1/1 to 1/10, more especially from 1/1 to 1/4. The life of the conjugate fiber is determined mainly by the rate of deterioration of the sheath component and the thickness of the sheath. In case of altering the life according to the purposes and uses, it is much easier and advantageous to change the ratio so as to change the thickness of the sheath rather than preparing many sheath components having a different deterioration rate. In order to exhibit the features of the molded article (II), namely the characteristics that the deterioration is a little during the use (before the life duration) and rapidly proceeds after reaching the life, it is preferable that the rate of contribution of the core component to the strength of the conjugate fiber is not less than 30%, especially not less than 40%, more especially not less than 50%. The thickness of the sheath (in the thinnest portion) which is the most widely used is usually not less than about 0.5 μm and not more than about 100 μm, preferably 1 to 10 μm.

It is effective in sufficiently exhibit the features of the conjugate fiber which is the molded article (II) to make the ratio of the deterioration rates of the core and sheath components large. This ratio of the deterioration rates is required to be at least 2, and is preferably at least 5, more preferably at least 10, and the range of about 5 to about 200 is the most frequently utilized. The time until the value of tensile strength of a fiber is reduced to ½ of the initial value of the fiber (non-deteriorated) when the fiber is degraded or deteriorated in the soil or water, namely the half-life of the strength (hereinafter referred to as "half-life"), is used as the index for the rate of deterioration. Since in many cases the strength decreases almost linearly with the lapse of time (up to the vicinity of the half-life), the half-life can be regarded as being inversely proportional to the rate of deterioration. The deterioration rate ratio is represented by the reciprocal of the ratio of the half-life values of the core and sheath components, wherein the half-life is obtained by a deterioration test of a single-component fiber prepared using each of the core and sheath components under substantially the same preparation conditions as those of a conjugate fiber. For example, the half-life ratio (c/d ratio) for a component (c) having a half-life of 3 months and a component (d) having a half-life of 2 years is 1/8, and the deterioration rate ratio is 8.

Of course, the deterioration rate is a relative one differing depending on the deterioration conditions. Even if using the same polymer, it becomes "less degradable" or "easily degradable" if the testing conditions or the comparison object are altered. Therefore, the ratio of deterioration rates is determined by deteriorating the both components under the same conditions. A suitable deterioration rate ratio can be selected according to the application purpose from a case of having been embedded in the soil, a case of having been fermented in a compost, a case of having been immersed in a waste water treating vessel containing an active sludge, a case of having been immersed in sea water, a case of having been immersed in an aqueous buffer solution (commercial product.) of pH 7.2 at 37° C. (known to be similar to embedding in the human body), and a case of having changed the temperature in these environments (acceleration test).

An instance of a method of embedding in the soil (upland field soil) at ordinary temperature (15° to 25° C.) is shown in Examples described after.

As the sheath and core components there are used those having an enough or large difference in relative rate of degradation between the both. The difference in degradation rate is obtained by changing various factors as mentioned before, but the factors such as purity, degree of modification, crystallinity, etc. among them are basic factors. From such points of view, there are many cases that it is desirable that the crystallinity of the sheath component is higher than that of the core component by at least 5%, especially at least 10%.

Similarly, there are many cases that it is desirable that the melting point of the sheath component (in case of an amorphous one, the softening point) is higher than that of the core component by at least 5° C., especially at least 10° C.

It is desirable that the core component and the sheath component strongly adhere to each other. (Of course, even if they are poor in adhesion property, the conjugate fiber in the molded article (II) has a much higher resistance to external force such as friction in comparison with a coating method, since the sheath component is also sufficiently drawn and oriented.) A good adhesion is relatively easily obtained by using akin (co)polyesters as the core and sheath components. In particular, a combination of (co)polyesters having the same main component (component included in an amount of not less than 50%) and modified by changing the amount of the secondary component gives a good adhesion property. For example, there are many combinations showing an excellent adhesion property in combinations of a homopolymer (modification rate 0%) and a copolymer containing it as a main component (modification rate 2 to 50%). Similarly, a combination of copolyesters having modification rates of, for example, 3% and 10% is also an instance of the combination showing a good adhesion property. A polymer containing L-lactic acid as the main component and a polymer containing L-hydroxybutyrate as the main component have a similar molecular structure to each other and they show a good adhesion property.

FIG. 12 is a view illustrating the deterioration characteristics of a conjugate fiber in the molded article (II). Curve 29 is a deterioration curve of a (co)polyester (e) having a high deterioration rate (half-life of 1 month), curve 30 is a deterioration curve of a (co)polyester (f) having a low deterioration rate (half-life of 2.5 years), and curves 31 and 32 are deterioration curves of conjugate fibers comprising a core of the (co)polyester (e) and a sheath of the (co)polyester (f).

The curve 31 shows an instance wherein the sheath is thin, so the sheath is substantially destroyed after about 3 months and the deterioration of the core then rapidly proceeds, thus showing a half-life of about 4 months. The curve 32 shows an instance wherein the thickness of the sheath is larger than that of the conjugate fiber in curve 31, so the sheath is substantially destroyed after about 5.5 months and the deterioration of the core then rapidly proceeds to show a half-life of 6.3 months. In curve 31 the life (period of use) is about 3 months, and in curve 32 the life is about 5.5 months. As understood from the figure, the conjugate fibers of the molded article (II) can possess very favorable deterioration characteristics such that they are not so deteriorated during the use, and after exceeding the life they are rapidly deteriorated. On the other hand, conventional single-component fibers have the disadvantage that the deterioration proceeds simply as shown by curves 29 and 30, so the strength remarkably decreases during the use or does not easily decrease even after the use. Also, in case of a coating method, the coating film is easy to be damaged by friction or the like, so it is very difficult to obtain, in a practical use, the characteristics as represented by curves 31 and 32 in FIG. 12.

The polymers used in the sheath and the core of the conjugate fibers of the molded article (II) are required to have a sufficient molecular weight in order to impart a sufficient strength to the fibers. In general, in many cases, it is preferable that the (co)polyesters containing an aliphatic component as a main component (not less than 50%) have a molecular weight (average molecular weight in case of the biodegradable copolyester of the present invention; weight average molecular weight in case of other (co)polyesters) of not less than 30,000, preferably not less than 40,000, more preferably 60,000 to 300,000. On the other hand, in case of the (co)polyesters containing an aromatic component as a main component (not less than 50%), there are many cases that the weight average molecular weight is preferably not less than 15,000, more preferably not less than 20,000, still more preferably 30,000 to 150,000.

The conjugate fibers sufficiently drawn of the molded article (II) are able to have usually a strength of not less than 2 g/d, and in many cases, to have a strength of not less than 3 g/d, more preferably not less than 4 g/d. Products having a high strength of not less than 6 g/d can also be relatively easily obtained.

The melting point or softening point of the polymers used in the sheath and the core of the conjugate fibers of the molded article (II) is preferably at least 100° C., more preferably at least 120° C., still more preferably at least 150° C., in order to impart a sufficient heat resistance to the fibers. However, in case of uses at low temperatures other than normal uses or in case of purposes to impart a heating weldability, polymers having a melting or softening point of not more than 100° C. can be utilized.

The conjugate fibers of the molded article (II) can be prepared by well-known multi-component fiber spinning methods such as melt spinning, dry spinning, wet spinning, and dry-wet spinning. Drawing, heat treatment, crimping and the like can also be conducted if needed. In particular, the melt spinning is preferable since it can be conducted at a high velocity and in a high efficiency. In particular, partially orientated yarns (POY) can be obtained by spinning at a spinning velocity of at least 3,000 m/min., and highly orientated yarns (HOY) can be formed by spinning at a spinning velocity of at least 5,000 m/min. Further, it is possible to continuously conduct polymerization-spinning by connecting with a polymerization step, and it is also possible to simultaneously conduct the spinning and the drawing by a spin-draw method, thus they are very efficient.

The conjugate fibers of the molded article (II) as mentioned above have excellent features that (1) sufficient orientation and crystallization of both the core portion and the sheath portion can be achieved by drawing or ultra-high velocity spinning, etc., whereby an excellent strength can be obtained, (2) control of the degradation rate can be conducted within a wide range, thus fibers having a low degradation rate (a long life) can also be easily obtained, (3) fibers being uniform in the composite structure and the thickness of sheath and having no defect can be easily obtained, thus the reliability of performances and quality is high, (4) the life of the sheath can be easily and freely changed by changing the thickness thereof, thus being applicable to wide ranges of purposes and uses, (5) the sheath and the core are prevented from peeling off owing to friction or the like by combining components (e.g. akin polymers) having a good adhesion property between the sheath and the core, and (6) the fibers can be prepared at a high velocity in a high efficiency, thus excellent in practicality and economical efficiency.

Not only the biodegradable copolyesters of the present invention but also any polyesters containing the lactic acid component as a main component can be used in the conjugate fibers of the molded article (III).

The polyesters containing the lactic acid component as a main component are polymers containing at least 50% of the lactic acid component such as L-lactic acid and/or D-lactic acid, and comprehend poly-L-lactic acid homopolymer, poly-D-lactic acid homopolymer, L-lactic acid/D-lactic acid copolymer, and these polymers into which not more than 50% of a second or third component is included by copolymerization or mixing. They are easily degradable (co)polyesters.

The polyesters containing the lactic acid component as a main component can be obtained by adding not more than 50% of the second or third component at the time of a melt polymerization, solvent polymerization and ring-opening polymerization of the lactic acid component, and reacting them.

The polylactic acid that the lactic acid component is polymerized is in general fairly stable in a dry state, but is easily hydrolyzed in neutral water or an aqueous solution (salts, etc.), or by action of organisms or by a weak alkali (for example, at most 0.1% aqueous solution of sodium hydroxide of pH at most 10), and the resulting lactic acid is further degraded with ease by organisms to convert finally into carbon dioxide gas and water. Therefore, the conjugate fibers of the molded article (III) can be divided safely and easily by the action of a neutral or weakly alkaline solution or organisms without wasting resources and without causing environmental pollution.

Lactic acid used as the main component of the easily degradable (co)polyesters [(co)polyesters including the biodegradable copolyesters of the present invention] in the conjugate fiber of the molded article (III) is L-lactic acid, D-lactic acid or a mixture of L- and D-lactic acid, but L-lactic acid prepared by a fermentation method is inexpensive and advantageous. Poly-L-lactic acid homopolymer and poly-D-lactic acid homopolymer have a high crystallinity, and there are many cases that their rate of degradation in a neutral environment or by a biological action is low. Consequently, in order to raise the rate of degradation, it is effective to introduce into poly-L-lactic acid, for example, 1 to 50%, preferably 3 to 30%, more preferably 5 to 20%, of D-lactic acid by means of copolymerization. Similarly, it is also effective to introduce L-lactic acid into poly-D-lactic acid within the above range by means of copolymerization.

Similarly, it is possible to enhance the degradability by copolymerizing poly-L-lactic acid or poly-D-lactic acid with 1 to 50% preferably 3 to 30%, of a second component capable of forming ester bond, for example, lactones (such as pivalolactone, caprolactone, etc.), hydroxycarboxylic acids (such as lactic acid, glycolic acid, etc.), combinations of glycols (for example, ethylene glycol, butanediol, hexanediol, octanediol, decanediol, and the like) and dicarboxylic acids (for example, succinic acid, adipic acid, sebacic acid, and the like).

As the above-mentioned comonomer component, there are preferred aliphatic compounds which are easy to be biologically degraded, e.g. a diol such as ethylene glycol, butanediol, hexanediol, octanediol or decanediol, a dicarboxylic acid such as succinic acid, adipic acid or sebacic acid, a hydroxycarboxylic acid, an aliphatic lactone, such as pivalolactone or caprolactone. Polyethylene glycol is also preferred because of having a biodegradability. Also, there can be utilized polymers having an adequate amount of branches or weak crosslinkages therein, produced by reacting a slight amount (for example, than not more 5% preferably not more than 2%) of a polyfunctional compound such as glycerol, pentaerythritol, trimellitic acid or pyromellitic acid at the time of polymerization for producing polymers containing the lactic acid component as a main component.

The easily degradable (co)polyesters in the conjugate fibers of the molded article (III) may contain materials other than polylactic acid and its copolymers as additives, for example, releasing agent, fluidity improver, water repellent, agent for imparting hydrophilic property, stabilizer, antioxidant, pigment, colorant, various inorganic particles and other improvers.

In general, polylactic acid is susceptible to hydrolysis, and when, after the melt polymerization thereof, it is cooled, solidified, formed into chips, dried, molten again and spun, it frequently decreases the molecular weight by degradation. Of course, in case of the conjugate fiber, since the easily degradable (co)polyester containing the lactic acid component as a main component is removed by degradation in the post-processing stage, the degree of polymerization on such a level as capable of conducting a multi-component fiber spinning is sufficient for the easily degradable (co)polyester. However, from the viewpoints of spinnability and strength of the obtained conjugate fiber, it is desirable that the easily degradable (co)polyester has a certain level of high molecular weight (for example, a weight average molecular weight of at least 40,000, preferably not less than 60,000 and not more than 300,000). It is also desirable to subject the produced polymer directly to multi-component fiber spinning without cooling to solidify it after the melt polymerization.

The fiber-forming aromatic copolyesters which are the other constituent component in the conjugate fiber of the molded article (III) are those containing at least 40%, preferably at least 50%, more preferably at least 60%, of the component derived from an aromatic compound. If the content is less than 40%, it is difficult to impart a heat resistance, a strength and a spinning property which are sufficient for forming the fiber.

As a polyester-forming aromatic compound, there are well known an aromatic dicarboxylic acid such as terephthalic acid, isophthalic acid, sulfoisophthalic acid or naphthalenedicarboxylic acid, an aromatic hydroxydicarboxylic acid such as hydroxybenzoic acid, and an aromatic diol such as bis-hydroxyethoxyphenyl methane. The fiber-forming polymers containing at least 40% of the aromatic compound component can be obtained by using these aromatic compounds in combination with an aliphatic diol such as ethylene glycol, propanediol, butanediol, hexanediol or decanediol, an aliphatic dicaroboxylic acid such as adipic acid or sebacic acid, or an aliphatic lactone such as caprolactone. For example, copolymers containing polybutylene terephthalate (PBT) or polyethylene terephthalate (PET) as a main component (at least 50%) copolymerized with other ester bond-forming components are useful as the aromatic polyester component for the conjugate fibers of the molded article (III) in points of fiber-forming property, crystallinity and melting point. By the way, PET is composed of 77% of an aromatic component, PBT is composed of 67% of an aromatic component, and a PET/polyethylene adipate copolymer in a ratio of 60/40 is composed of 46% of an aromatic component.

The above-mentioned aromatic copolyester containing at least 40% of the aromatic component is capable of forming fibers, and the fibers after a division treatment and the fiber structures are desired to have a strength meeting the purposes. From this point of view and from the points of spinnability and drawing property, the aromatic copolyester having a weight average molecular weight of at least 15,000, especially at least 20,000, is preferred. Of course, the aromatic copolyester must have a sufficient strength even after the division of the conjugate fiber without being degraded in a neutral or weak alkaline environment in which the easily degradable (co)polyester containing the lactic acid component as a main component is degraded, or by an action of organisms. For example, it is preferable that the rate of degradation (weight reduction) of the aromatic copolyester when treated with an aqueous weakly alkaline solution (0.1% aqueous solution of sodium hydroxide, at 25° C.) is not more than $\frac{1}{10}$, especially not more than $\frac{1}{50}$, of that of the easily degradable (co)polyester.

The composite structure in transverse cross section of the conjugate fiber of the molded article (III) is such that the aromatic copolyester is divided into a plurality of segments by the easily degradable (co)polyester and at least a part of the fiber surface is occupied by the easily degradable (co)polyester. As a result of having this structure, the conjugate fiber of the molded article (III) is divided into at least two filaments, preferably at least 3 filaments, more preferably at least 4 filaments, by decomposing the easily degradable (co)polyester to remove it, whereby the fineness of the fiber is greatly decreased and the softness and water absorbing property are increased.

The objects of dividing the conjugate fiber of the molded article (III) are (1) to form fine fibers, (2) to form ultra-fine fibers, (3) to form modified cross-sections, (4) to form special cross-sections, (5) to impart special functions, and the like. In case of the object of forming fine fibers, the number of segments of the aromatic copolyester in the single fiber section is from about 2 to about 8. In case of the object of forming ultra-fine fibers, the number of segments is at least 8, for example, from about 10 to about 100. In case of forming a modified cross-section, the transverse cross section of each of the segments can be formed into polygon shape, star shape, multi-blade shape, flat shape, shape composed of combined flat portions (e.g. E-shape, F-shape, H-shape, I-shape, K-shape, L-shape, M-shape, N-shape and T-shape) or other desired shapes. An example of the special cross-section is, for instance, C-shape.

The transverse cross-sectional shape of the conjugate fiber of the molded article (III) can be circular, elliptic or noncircular (e.g. polygonal shape or multi-blade shape). The ratio (volume ratio) of the easily degradable (co)polyester to the aromatic copolyester can be an arbitrary value, but the ratio is preferably from 5/95 to 75/25, more preferably from 10/90 to 60/40. If the proportion of the easily degradable (co)polyester is less than 5% (by volume), it becomes difficult to have favorable fiber cross section for the conjugate fiber as shown in FIGS. 13 to 24. As a result, it also becomes difficult to divide the fiber-forming segments made of the aromatic copolyester by dissolving the easily degradable (co)polyester. On the other hand, if the proportion of the easily degradable (co)polyester is more than 75% (by volume), it also becomes difficult to have a fiber cross-section favorable for the conjugate fiber. Further, since the component to be dissolved overwhelmingly increases, the yield is very poor, thus economically disadvantageous.

Figure 13:
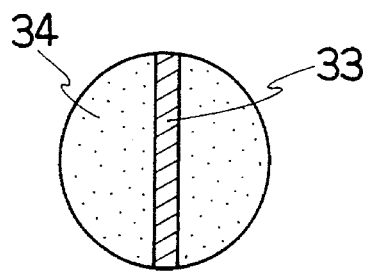
FIG. 13 is an illustrative transverse sectional view showing an example of the transverse sectional structure of a conjugate fiber (half-division conjugate fiber) which is a molded article of the present invention.
Figure 14:
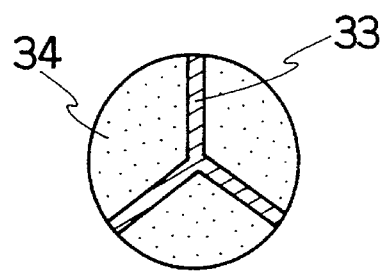
FIG. 14 is an illustrative transverse sectional view showing an example of the transverse sectional structure of a conjugate fiber (radial conjugate fiber) which is a molded article of the present invention.
Figure 15:
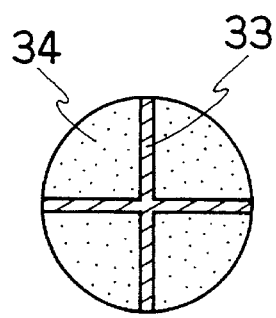
FIG. 15 is an illustrative transverse sectional view showing another example of the transverse sectional structure of the conjugate fiber (radial conjugate fiber) which is a molded article of the present invention.
Figure 16:
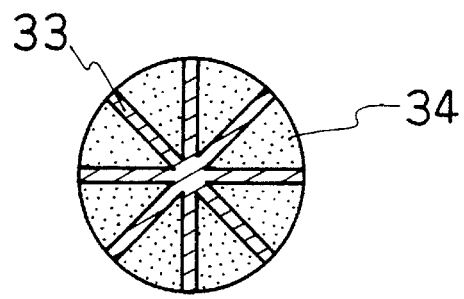
FIG. 16 is an illustrative transverse sectional view showing still another example of the transverse sectional structure of the conjugate fiber (radial conjugate fiber which is a molded article of the present invention.
Figure 17:
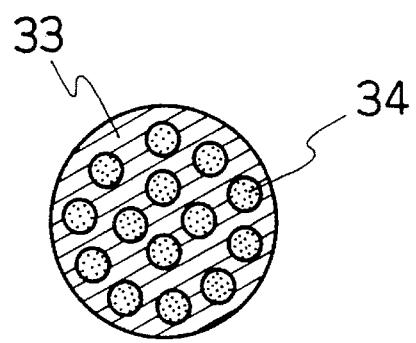
FIG. 17 is an illustrative transverse sectional view showing an example of the transverse sectional structure of a conjugate fiber (multifilamentary conjugate fiber) which is a molded article of the present invention.
Figure 18:
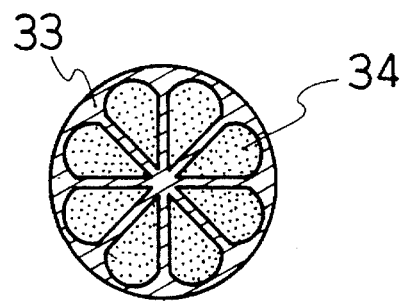
FIG. 18 is an illustrative transverse sectional view showing an example of the transverse sectional structure of a conjugate fiber (petal-shaped conjugate fiber) which is a molded article of the present invention.
Figure 19:
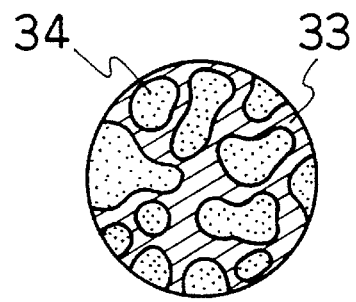
FIG. 19 is an illustrative transverse sectional view showing an example of the transverse sectional structure of a conjugate fiber (multi-islands-sea type conjugate fiber) which is a molded article of the present invention.
Figure 20:
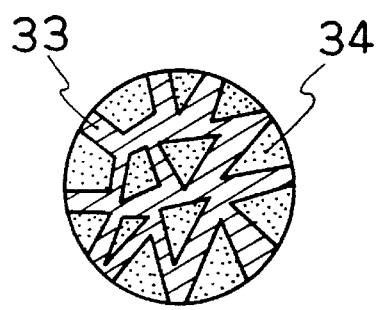
FIG. 20 is an illustrative transverse sectional view showing aft example of the transverse sectional structure of a conjugate fiber (mosaic-like conjugate fiber) which is a molded article of the present invention.
Figure 21:
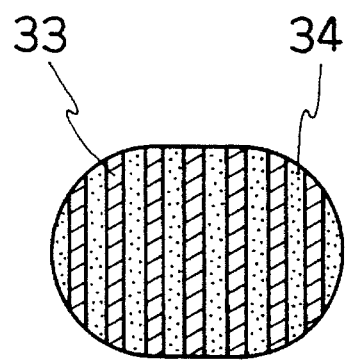
FIG. 21 is an illustrative transverse sectional view showing an example of the transverse sectional structure of a conjugate fiber (multi-layer type fiber) which is a molded article of the present invention.
Figure 22:
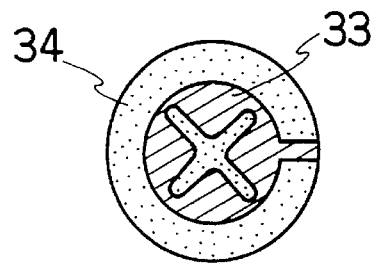
FIG. 22 is an illustrative transverse sectional view showing an example of the transverse sectional structure of a conjugate fiber (special conjugate fiber) which is a molded article of the present invention.
Figure 23:
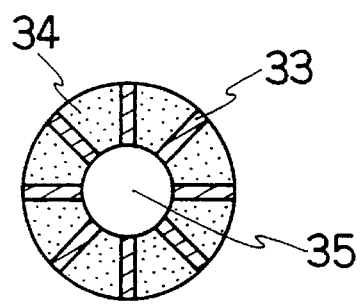
FIG. 23 is an illustrative transverse sectional view showing an example of the transverse sectional structure of a conjugate fiber (hollow radial conjugate fiber) which is a molded article of the present invention.
Figure 24:
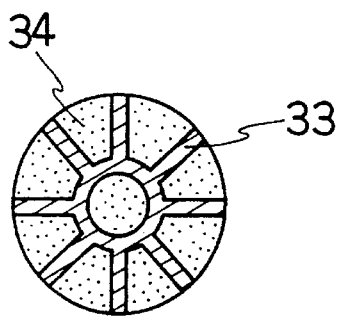
FIG. 24 is an illustrative transverse sectional view showing an example of the transverse sectional structure of a conjugate fiber (core-provided radial conjugate fiber) which is a molded article of the present invention.

Examples of the transverse cross-sectional structure of the conjugate fibers of the molded article (III) are shown in FIGS. 13 to 22. In the figures, oblique line portion 33 is a segment made of the easily degradable (co)polyester containing the lactic acid component as a main component, and dotted portion 34 is a segment made of the fiber-forming aromatic copolyester containing an aromatic compound as a main component. FIG. 13 shows an instance wherein the aromatic copolyester 34 is divided into two portions. FIGS. 14 to 16 show instances of being conjugated in a radial form wherein the aromatic copolyester 34 is divided by the easily degradable (co)polyester of a radial shape into three segments in FIG. 14, four segments in FIG. 15, and eight segments in FIG. 16. FIG. 17 shows an instance of being conjugated in a multi-core (or islands-sea) form wherein the aromatic copolyester 34 is divided into 14 cores (islands) by the matrix (sea) of the easily degradable (co)polyester 33. FIG. 18 shows an instance of being conjugated in a petal form wherein the aromatic copolyester 34 is divided into eight petal-shaped segments by the easily degradable (co)polyester 33. FIG. 19 shows an instance of being conjugated in a multi-islands-sea form. FIG. 20 shows an instance of being conjugated in a mosaic form wherein the aromatic copolyester 34 is divided into segments in the form of islands and broken pieces of various shape. FIG. 21 shows an instance of a multi-parallel type conjugate fiber wherein the aromatic copolyester 34 is divided into eight thin-layered segments. FIG. 22 shows an instance of a special cross-sectional shape wherein the aromatic copolyester 34 is divided by the keyhole-like easily degradable (co)polyester 33 into a C-shaped segment and a radial core. If this conjugate fiber is treated with a weak alkali to decompose and remove the easily degradable (co)polyester 33, a hollow fiber excellent in water absorption property and heat retaining property is obtained. FIG. 23 shows an instance of being conjugated in a hollow radial form wherein the aromatic copolyester 34 is divided by the easily degradable (co)polyester 33 into eight segments wherein numeral 35 is a hollow portion. FIG. 24 is an instance of being conjugated in a core-provided radial form wherein the aromatic copolyester 34 is divided by the easily degradable (co)polyester 33 into a central core and 8 segments disposed around the core.

The thickness of the conjugate fiber is usually not less than 0.5 d and not more than 20 d, preferably not less than 1 d and not more than 10 d. Fibers having a thickness of less than 0.5 d can be made, but the workability and productivity are poor or the production thereof requires a special method and is not general.

The thickness of the fiber of the aromatic copolyester portion after the degradation of the easily degradable (co)polyester is, therefore, usually not more than 1 d, preferably not more than 0.5 d, more preferably not more than 0.2 d, still more preferably not more than 0.1 d, and is not less than 0.01 d. When the thickness of the fiber is not more than 1 d, the gloss and softness becomes marked based on its thinness, and properties peculiar to ultra-fine fibers, such as wiping property, which are not seen in conventional fibers, appear at and below about 0.5 d. This property becomes particularly marked below 0.2 d.

The conjugate fibers of the molded article (III) can be prepared by conducting a multi-component fiber spinning in a manner such as melt spinning, wet spinning, dry spinning or wet-dry spinning, but the multi-component fiber melt spinning method is the best from the viewpoints of good stability in composite structure and good efficiency.

To the melt spinning method are applied a two step method wherein the spinning and the drawing are conducted in separate steps, a spin-draw method wherein the spinning and the drawing are conducted simultaneously, a method for preparing a partially oriented yarn (POY) by conducting the spinning at a high velocity (e.g. 3,000 to 4,000 m/min.), a method for preparing a highly oriented fiber at one effort by conducting the spinning at a ultra-high velocity (e.g. not less than 5,000 m/min.), a Spun-Bond method, a flash spinning method, and the like.

For achieving the multi-component fiber melt spinning, it is desirable that the difference in melt viscosities at the melting point and the spinning temperature between the easily degradable (co)polyester and the aromatic copolyester is not so large. The melting point of poly-L-lactic acid homopolymer drawn for crystallization is about 178° C. The melting point of modified polylactic acids prepared by copolymerization or mixing with a third component lowers, in many cases, with decrease of the crystallinity, and finally they become amorphous and the melting point of crystals disappears. However, for smoothly conducting spinning, drawing, production of knit and woven fabrics and processing step, it is preferable that the easily degradable (co)polyester has a melting point or softening point of at least 100° C., especially at least 130° C.

On the other hand, the melting point of the aromatic copolyester can be considerably changed by changing the composition thereof, but it is preferable in smoothly conducting the multi-component fiber melt spinning with the easily degradable (co)polyester that the aromatic copolyester has a melting point or softening point of 100° to 250° C., especially 130° to 220° C.

Next, the process for preparing molded articles from the copolyesters of the present invention is explained below.

In the present invention, the molded articles of biodegradable copolyesters are prepared by subjecting to a continuous polymerization in a molten state a mixture of a lactic acid component comprising L-lactic acid, D-lactic acid and/or their cyclic dimers (lactide) as a main component with (A) a component comprising polyethylene glycol having a number average molecular weight of at least 300, (B) an aliphatic polyester component or (C) a sulfo group-containing ester-forming compound component to produce the biodegradable copolyesters having an average molecular weight of at least 50,000, leading the resultant directly to a molding machine without solidification and chip formation thereof, and conducting melt molding.

The first feature of the process of the present invention is that the molding is carried out using a polymer, the molecular weight of which is markedly raised to a much higher level than that of conventional ones, and the second feature is that the molecular weight is prevented from lowering in the fiber forming step as much as possible. For this purpose, in the present invention monomers containing the lactic acid component as a main component are continuously copolymerized in the molten state, and after the polymerization the polymer (biodegradable copolyester of the present invention) is directly led to a molding machine without soldifying and forming it into chips and is melt-molded.

Upon the copolymerization, it is preferable that the equivalent ratio of hydroxyl group and the carboxyl group is substantially 1, and an antioxidant is added.

The higher the molecular weight of the copolyester to be produced, the better the strength of the fibers to be produced. The average molecular weight is usually at least 50,000, especially at least 70,000, preferably at least 80,000, more preferably at least 100,000, still more preferably at least 120,000.

If the average molecular weight is excessively large, a long polymerization time is required, so a reverse reaction proceeds to cause increase of by-products and discoloration or to decrease the fluidity at the time of melting and the moldability. From such points of view, the average molecular weight is at most 500,000, preferably not more than 400,000, more preferably not more than 300,000.

The copolyesters used in the process of the present invention contain the above-mentioned components (A) to (C). Since the amounts of them to be copolymerized and the like are as already explained, the explanation is omitted here.

The copolyesters produced by copolymerization (for example, in case of the copolyester (A), the biodegradable copolyester having an average molecular weight of at least 50,000, especially at least 70,000, obtained by continuously copolymerizing 99.5 to 85% of L-lactic acid, D-lactic acid and/or their cyclic dimers (lactide) with 0.1 to 15% of polyethylene glycol having a number average molecular weight of at least 300 in a molten state) are directly introduced to a spinning head without solidification and chip formation thereof, subjected to melt spinning, then drawn at least 3 times, and heat-treated to give biodegradable copolyester molded articles having a fiber strength of at least 3 g/d with keeping an average molecular weight of at least 50,000, especially at least 70,000.

Of course, a circulation line and a withdrawing apparatus for the polymer may be provided, as occasion demands, in order to balance the rate of polymerization and the spinning velocity. Also, it is preferable to provide a device for removing the monomers between the polymerization apparatus and the spinning apparatus. For example, the molten polymer sent out of the polymerization apparatus by a geared pump is introduced into the spinning apparatus through an expansion vessel or a thin film type evaporation apparatus to once release the pressure of the molten polymer, whereby the residual monomers, and low boiling substances and water produced by decomposition, can be removed to such an extent as not causing troubles in practical stable manufacturing and quality.

As mentioned above, the copolyester (A) is directly introduced into a spinning machine. The copolyester is required to have an average molecular weight of at least 50,000, especially at least 70,000, preferably at least 80,000. More preferably, the average molecular weight is at least 100,000 and the residual monomer content is at most 5%, especially the average molecular weight is at least 120,000 and the residual monomer content is at most 3%.

If the molecular weight is less than 50,000, the spinning and drawing workability of the fiber is not sufficient, and the fiber strength does not easily reach 3 g/d. In case that the molecular weight of the polymer is not less than 80,000, it has a sufficient spinning and drawing workability, and moreover the fiber strength may reach 4 g/d.

However, if the molecular weight exceeds 500,000, the spinning and drawing properties are lowered, so it becomes difficult to obtain a sufficient production speed. Therefore, the most preferable molecular weight is from 120,000 to 300,000.

A slight amount of monomers remaining in the polymer can be removed by the above-mentioned method, and a slight amount of still remaining monomers and the like sublime at the time of spinning out the polymer from the outlet of a spinneret. The sublimates are sucked and recovered by cooling air which serves also to cool the filaments spun out. The recovered monomers and others are separated, purified and utilized again as the raw materials for the polymerization.

The spinning temperature may be the same as the polymerization temperature, or may be changed up and down to some extent in accordance with the viscosity of the polymer. However, the spinning is usually carried out at a temperature within the range between the melting point of the polymer and a temperature higher than the melting point by at most about 50° C. Preferably, the spinning temperature is from the melting point of polymer + about 10° C. to the melting point of polymer + about 30° C.

The spinnerets may be those used in a usual melt spinning. It is also possible to use spinnerets having at most 200 holes for filament production and spinnerets having at least 30,000 holes for staple production. The size of the hole in the spinnerets may be a usually adopted size. The shape of the spinnerets is not particularly limited. For instance, any of the spinnerets used at present such as circular, hollow circular and rectangular spinnerets can be used without any limitation.

The spinning conditions, such as taking-up speed, oiling and optional interlacing, are selected within the ranges of usual conditions. The spinning draft (taking-up speed/spinning-out speed ratio) is usually not less than 30, preferably not less than 40 and not more than 500.

After the spinning, drawing is conducted. The drawing can be conducted by various methods such as one stage drawing-heat treatment and two stage drawing-heat treatment. The drawing temperature is usually from 50° to 100° C., preferably from 60° to 90° C., more preferably from 60° to 80° C. In case of successively conducting the second stage drawing, the drawing temperature in the second stage is usually within the range between the drawing temperature in the first stage and the first stage drawing temperature +20° C. The heat treatment may be suitably conducted in accordance with the objects of the fibers. That is to say, for maintaining a high shrinkability, heat treatment at a lower temperature is better or no heat treatment may be conducted. Conversely, for lowering the shrinkability of fibers as low as possible to obtain stable fibers, it is better to conduct the heat treatment at temperatures as high as possible. Usually, the heat treatment temperature is at least (drawing temperature +20° C.), preferably within the range between drawing temperature +20° C. and drawing temperature 50° C., provided that it is below the melting point of the polylactic acid copolymers. The higher the drawing ratio, the higher the fiber strength. In general, the drawing ratio is at least 2.5 times, preferably 3.0 to 6 times, more preferably 3.5 to 5 times.

In case of conducting the drawing in two or more stages, it is conducted under basically the same conditions, but the second stage drawing ratio is usually made lower than the first stage drawing ratio.

The fibers after the drawing have a fiber strength much higher than that of conventional biodegradable fibers, and the fiber strength is usually at least 3 g/d, preferably at least 3.5 g/d, more preferably at least 4 g/d, particularly preferably at least 5 g/d.

The degree of crystal orientation of the fibers is fairly high. The degree of crystal orientation is determined from the half-value width of the wide angle X-ray diffraction. In case of the high strength fibers of the present invention, the degree of crystal orientation is usually at least 70%, preferably at least 75%, more preferably at least 80%.

The fibers after the drawing have a melting point of not less than 110° C. The higher the melting point, the better in point of the heat resistance. Food containers are required to be able to conduct a sterilization treatment with boiling water of 100° C. For this reason, it is necessary that the melting point is at least 110° C., and a melting point of not less than 130° C. is particularly preferable. Similarly, the fibers are required to withstand dyeing at 100° C. and bacteria, and from such points of view, it is necessary that the melting point is not less than 110° C., and a melting point of not less than 130° C. is particularly preferable. Further, it is preferable to withstand a high degree of sterilization (high pressure steam of 130° C.) and a high pressure dyeing (high pressure water bath of 130° C.), and for these purposes, a melting point of not less than 150° C. is preferable.

Also, the stability of the fibers increases with increasing the degree of crystallization, but the biodegradability tends to somewhat lower. In case of the so obtained fibers, the heat of fusion at the melting point is usually at least 5.0 cal/g, preferably from 7.0 to 12.0 cal/g, for the purpose of good dynamic stability and biodegradability of the fibers.

According to the process of the present invention, there can be solved a problem of deterioration owing to oxidation in a cooling step which occurs when taking out a conventional polymerization chip once as a solid polymer by water cooling or air cooling, and a problem of deterioration and decrease in molecular weight at the time of drying, for example, a problem that a polymer having a molecular weight of 100,000 at the time of polymerization decreases its molecular weight to about 80,000 after the drying, and further decreases to about 60,000 if molten again for spinning, so fibers having a high molecular weight and a high strength are not obtained. Thus, fibers having a high molecular weight and a high strength can be prepared practically and inexpensively.

Also, according to the process of the present invention, there can be solved a problem in lowering of quality of final products (discoloration and production of depolymerization products) and lowering of workability encountered when raising the degree of polymerization in order to raise the molecular weight of the final products.

With respect to concrete examples of use of the thus prepared fibers, an explanation is given below.

Stockings having an excellent biodegradability are obtained by knitting using a fiber of the above-mentioned biodegradable copolyester and a polyurethane fiber as main knitting yarns.

The stockings comprehends stockings and pantyhose for men and women, but are particularly those intended for women's use.

The fibers used in the stockings are gray yarn, finished yarn, covered yarn and the like, and they are used properly depending on parts of the stocking and how to knit.

In case of using for stockings, it is preferable that the lactic acid component is L-form or D-form having an optical purity of at least 90%. If the optical purity is low, the crystallinity of the polymer is low, so the heat resistance and mechanical properties of the polymer are decreased.

Also, as the polylactic acid-based polymer, there can be used homopolymers having an average molecular weight of at least 50,000, preferably at least 80,000, more preferably at least 100,000, especially from 100,000 to 300,000, but copolyesters are preferable, since if 0.1 to 10% of polyethylene glycol having a number average molecular weight of at least 600, preferably 0.5 to 5% of polyethylene glycol having a number average molecular weight of 2,000 to 20,000, is copolymerized thereinto, the polymerization procedures, particularly mixing, degassing, liquid sending and the like, become easy and the uniform copolyesters having an excellent quality are obtained, so the heat fluidity of the polymers is remarkably improved and the spinning and drawing properties and the yarn properties (particularly strength) are also improved.

If the average molecular weight is less than 50,000, not only the strength and elongation are low, but also the workability such as spinning and drawing properties becomes insufficient. Also, if the average molecular weight is more than 300,000, the melt viscosity of the polymers becomes too large, so the spinning temperature must be raised and the polymers are easy to cause their degradation and deterioration in the spinning stage.

The fibers to be used, formed from the biodegradable copolyesters, are preferred to have higher strength and elongation because of causing less troubles in a covering step with a urethane yarn and in a knitting step for producing stockings. The strength is usually at least 3 g/d, preferably at least 3.5 g/d, more preferably at least 4 g/d. Also, the elongation is usually at least preferably at least 30%, more preferably at least 35%.

With respect to the fineness of the fibers, the thinner, the softer the feeling of wearing, but a problem in durability may arise. Therefore, the fineness is usually from 5 to 50 d, preferably from 10 to 30 d. The denier of single yarn constituting the fiber is at most 5 d, preferably at most 3 d, more preferably at most 2 d, and is usually not less than 1 d.

The molecular weight of PEG used in stockings is preferably not less than 600 in terms of number average molecular weight. In order to obtain the copolyesters having a high degree of polymerization and a high melting point, PEG is preferred to have a higher molecular weight, and it is more preferably not less than 1,000, particularly preferably from 4,000 to 20,000.

The copolyesters of the present invention have a melting point of at least 110° C. The higher the melting point, the more preferable in point of heat resistance. The stockings are exposed usually to a temperature of not less than 100° C., in certain circumstances at a temperature of not less than 120° C., at the time of dyeing. Therefore, preferably the melting point is not less than 130° C.

To the fibers formed from the biodegradable copolyesters may be added a delustering agent such as titanium oxide or magnesium oxide, and various organic and inorganic pigments, including carbon black. In particular, the addition of pigments is important in raising a fashion character of pantyhose. These delustering agents and pigments may be added at the time of conducting either the polymerization for the biodegradable copolyesters or the spinning, but it is more preferable to add just before the spinning.

Examples of other additives are a heat stabilizer, a light stabilizer, a water repellent, an agent for imparting a hydrophilic property, a lubricant and other additives usually employed in fiber manufacturing, and these additives can be added.

As the polyurethane fiber, there can be used urethane fibers usually employed in pantyhose. Polyester type polyurethane fibers which are convenient for biodegradation, are preferred rather than polyether type polyurethane fibers.

The fineness of the polyurethane fibers is required to give consideration to the stretch back property of articles required for covered yarns. The fineness is usually from 10 to 30 d and the number of filaments is usually from 1 to 3, but they are not always required to fall within these ranges and more suitable fineness and filament number should be used in accordance with the uses and performances.

The polyurethane fibers can be prepared by any of usually employed solution spinning methods (wet spinning, dry spinning) and melt spinning methods. However, melt spinnable polyurethanes have a great advantage that combined filament formation is possible in the spinning stage and a step can be omitted.

A method for producing stockings using the polyurethane fiber and the biodegradable copolyester fiber may be the same as conventional methods for producing stockings from polyurethane fiber and nylon fiber or from polyurethane fiber and polyester fiber. That is to say, there are adoptable a method wherein the biodegradable copolyester fiber is wound single (single covered yarn) or double (double covered yarn) around the polyurethane fiber as a core component, and other combined methods.

The polyurethane fiber wound with the biodegradable copolyester fiber is knitted up to stockings in a usual manner. For instance, there are methods for knitting up by using only the covered yarn, or by using alternately the covered yarn and the biodegradable copolyester fiber.

It is also preferable to reinforce the toe portion and the heel portion by increasing the knitting density or altering the knitting structure.

In the panty portion is used a covered yarn made of the biodegradable copolyester fiber having a somewhat larger thickness and the urethane yarn, or a covered yarn in combination with a false twist finished yarn of the biodegradable copolyester fiber. The fineness of the biodegradable copolyester fiber is usually at most 200 d, preferably at most 150 d, more preferably at most 100 d, particularly preferably from 50 to 80 d. Of course, this yarn is also used in the covered yarn with the urethane yarn. Also, other fibers such as silk and nylon may be used in part.

To conduct scouring, dyeing and setting in order to improve the quality and consumption performances of the articles after the knitting is the same as in the production of usual pantyhose.

The present invention is explained below based on Examples, but is not limited to these Examples.

BEST MODE FOR CARRYING OUT THE INVENTION

In the present invention, the average molecular weight of the copolymers containing the lactic acid component as a main component indicates a weight average molecular weight of high molecular weight compounds (excepting those having a molecular weight of not more than 500) by GPC analysis (by calibration based on standard polystyrene samples) of a 0.1% chloroform solution of a sample.

Also in the present invention, the melting point of a polymer is a peak value of heat absorption for fusion of main crystals, measured (heat-up rate of 10° C./min.) by a differential scanning calorimetry (DSC) method with respect to fibers sufficiently oriented and crystallized by spinning, drawing and heat-treating. In case of an amorphous polymer, a temperature at which the melt viscosity is 100,000P is regarded as the softening point.

Further, the viscosity (relative viscosity) of a solution of the polymer of the present invention indicates a value measured at 20° C. by an Ostwald viscometer with respect to a solution of 1 g of a sample dissolved in 100 ml of a mixed solvent of phenol and tetrachloroethane in a ratio of 6/4 (weight ratio).

Also, the impact strength in the present invention is a value measured by an Izod method (ASTM D-256a) with respect to a V-notched sample having a thickness of ½ inch and a width of ¼ inch. The copolymers of the present invention show an Izod impact strength of preferably not less than 1 kg/cm/cm.

EXAMPLE 1 AND COMPARATIVE EXAMPLES 1 AND 2

L-lactide having 99.8% optical purity sufficiently dried (water content not more than 100 ppm) and pre-melted, and PEG (#6000 produced by Nippon Oil & Fats Co., Ltd.) having a number average molecular weight of 8,200, which was dried and melted similarly and to which 0.1% of Irganox 1010, i.e. a hindered phenol antioxidant produced by Ciba Geigy Corp., was added, were supplied to the raw material feed part of a twin-screw kneader in a ratio (weight ratio) of 98/2. Simultaneously, 0.3% of tin dioctylate was added as a polymerization catalyst based on the lactide.

The twin-screw kneader is one shown in FIGS. 1 and 2, and comprises plural feed screws of 30 mm diameter and plural 7 mm thick two blade-shaped agitating elements. The feed screws were disposed in the raw material feed part and two vent hole parts, and the agitating elements were disposed in the other parts.

The section of the cylinder was elliptic and was constricted around its center portion. The temperature was set at 190° C. A nitrogen gas was supplied through the first vent hole and exhausted through the second vent hole. Two rotation shafts were rotated in the same direction, and the number of rotations was 60/min.

The polymer discharged from the twin-screw kneader was fed to a second 40 mm diameter twin-screw kneader directly connected thereto and provided with two vent holes. The cylinder temperature was 190° C. The rotation was in the same direction, and the number of rotations was 40/min. A small amount of a nitrogen gas was supplied through the first vent hole, and the second vent hole was connected to a vacuum pump to keep a vacuum degree at about 0.5 Torr, while the above-mentioned antioxidant was added in an amount of 0.1% based on the polymer. The polymer discharged from the second twin-screw kneader was fed by a geared pump, filtered with a 20 μm filter, extruded through a 2 mm diameter nozzle, cooled with water to solidify and cut to obtain chips P1. The average residence (reaction) time of the polymer in the first twin-screw kneader was 5.5 minutes, and the residence time in the second kneader was 16 minutes. The total average polymerization time was 21.5 minutes.

There was no discoloration on the P1, and the transparency was excellent.

For comparison, 0.3% of tin dioctylate was added to 15 kg of lactide. In a 100 l polymerization vessel with a usual uniaxial agitator, the mixture was polymerized under normal pressure at 210° C. for the first one hour in a nitrogen stream, and then the pressure was reduced gradually over 30 minutes, followed by 60 minutes polymerization at 0.5 Torr. Since the torque of the agitator reached nearly a constant value, the pressure was turned back to normal pressure, followed by pressure application, extrusion, cooling and cutting to give chips P2 of a PLLA homopolymer.

P2 was tinged with light brown, and opaque portions and remarkably colored portions were observed in part.

Chips P3 were prepared in the same manner as in P2 except that 2% of PEG having a number average molecular weight of 8,200 was added to 98% of lactide and they were polymerized.

P3 was tinged with light brown, and there were opaque portions and remarkably colored portions.

P1 was melted at 240° C. by a screw extruder, spun through an orifice of 245° C. with 0.2 mm diameter holes, and cooled in air, followed by oiling and winding at a speed of 800 m/min, to give an un-drawn yarn UY1. UY1 was drawn at 70° C. in a drawing ratio of 3.3, and then heat-treated at 150° C. under a tension and wound at a speed of 600 m/min to give a drawn yarn DY1 of 75d/18f (filament).

Drawn yarns DY2 and DY3 were prepared with the use of P2 and P3 in the same manner as in DY1 except that the drawing was conducted in a drawing ratio as high as possible.

The workability in spinning and drawing of DY1, DY2 and DY3 and the characteristics of them are shown in Table 1.

Also DY1, DY2 and DY3 were immersed in an activated sludge, and 6 months later the strength of them was measured. As a result of the measurement, the strength of them was all not more than 1/3 of the initial strength, and it was found that DY1, DY2 and DY3 have a good biodegradability.

With the use of respective chips, the polymers were melted at 180° C. by a screw extruder, extruded from a T-shaped spinneret of the same temperature, cooled and wound to prepare a film. Then the film was stretched 3.8 times at 60° C. and heat-set at 120° C. to prepare a stretched film having a thickness of 58 μm. The impact strength of the samples obtained from the respective chips and the tensile strength and elongation of the films were measured. The results are shown in Table 2.

TABLE 2

|  | Example No. 1 | Comparative Example 1 | Comparative Example 2 |
| --- | --- | --- | --- |
| Chip | P1 | P2 | P3 |
| Impact strength (kg · cm/cm) | 1.8 | 0.6 | 0.8 |
| Film strength (kg/mm²) | 30.7 | 19.4 | 18.8 |
| Film elongation (%) | 22 | 14 | 18 |

EXAMPLE 2

PEG having various molecular weights (number average molecular weights) were copolymerized with lactide in various copolymerization ratios in nearly the same manner as in Example 1.

The proportion of PEG in copolymerization, and the average molecular weight, polymerization conversion and melting point of the obtained copolymers are shown in Table 3.

The polymerization conversion is the weight percentage of a high molecular weight component having a molecular weight exceeding 500, that is to say, one excluding a low molecular weight component such as a residual monomer in the polymer. The melting point of the polymer was measured by a DSC method. There is a case where it is somewhat lower (by about 2° to about 7° C.) than the melting point of

TABLE 1

|  | Example No. 1 | Comparative Example 1 | Comparative Example 2 |
| --- | --- | --- | --- |
| Yarn | DY1 | DY2 | DY3 |
| Polymer composition | Copolyester containing 2% PEG 8200 | PLLA homopolymer | Copolyester containing 2% PEG 8200 |
| Viscosity of polymer solution | 2.8 | 1.8 | 1.7 |
| Average molecular weight of polymer | 82000 | 36000 | 31000 |
| Melting point (°C.) | 171 | 178 | 170 |
| Spinning workability | good, no yarn breaking | bad, yarn breaking observed | bad, frequent yarn breaking |
| Drawing ratio | 3.3 | 2.8 | 2.8 |
| Drawing workability | good no yarn breaking | bad frequent yarn breaking | bad frequent yarn breaking |
| Strength (g/d) | 2.8 | 1.7 | 1.5 |
| Elongation (%) | 28 | 16 | 17 |
| Young's modulus (g/d) | 5.10 | 3.47 | 3.44 |

It is found from Table 1 that as compared with DY2 and DY3 prepared by the conventional process, DY1 prepared from the copolymer of the present invention has a very excellent workability in spinning and drawing and an excellent toughness (strength and elongation).

Similarly, V-notched samples for an impact test were prepared with the use of P1, P2 and P3 by means of an injection molding machine of 175° C.

a drawn and oriented fiber, but they are nearly approximate in values. The proportion copolymerization shown in Table 3 indicates the composition of raw materials charged. The PEG content in the obtained high molecular weight component is obtained, for example, if the polymerization conversion is 90%, by multiplying the PEG proportion in the raw material composition by about 1.1.

TABLE 3

| Number average molecular weight of PEG | | Proportion of PEG in copolymerization (%) | | | | | | | | |
|---|---|---|---|---|---|---|---|---|---|---|
| | | 0.1 | 0.3 | 0.5 | 1 | 3 | 6 | 8 | 10 | 12 |
| 600 | Mw (*1) × $10^{-3}$ | 71 | 65 | 51 | 50 | 22 | — | — | — | — |
| | Conversion (%) | 82 | 86 | 81 | 80 | 71 | — | — | — | — |
| | Tm (*2) (°C.) | 166 | 164 | 166 | 162 | 160 | — | — | — | — |
| 1000 | Mw × $10^{-3}$ | 85 | 82 | 79 | 55 | 51 | 26 | — | — | — |
| | Conversion (%) | 89 | 88 | 85 | 83 | 83 | 70 | — | — | — |
| | Tm (°C.) | 167 | 166 | 168 | 163 | 165 | 165 | — | — | — |
| 3500 | Mw × $10^{-3}$ | 91 | 94 | 82 | 88 | 80 | 55 | 30 | — | — |
| | Conversion (%) | 88 | 85 | 85 | 80 | 81 | 86 | 62 | — | — |
| | Tm (°C.) | 168 | 166 | 166 | 167 | 167 | 167 | 166 | — | — |
| 8200 | Mw × $10^{-3}$ | 101 | 103 | 100 | 83 | 103 | 90 | 51 | 33 | — |
| | Conversion (%) | 91 | 90 | 91 | 88 | 89 | 86 | 82 | 75 | — |
| | Tm (°C.) | 170 | 169 | 168 | 168 | 167 | 167 | 167 | 162 | — |
| 10500 | Mw × $10^{-3}$ | 92 | 95 | 90 | 90 | 88 | 90 | 82 | 50 | 42 |
| | Conversion (%) | 90 | 90 | 91 | 89 | 90 | 87 | 88 | 77 | 67 |
| | Tm (°C.) | 170 | 169 | 169 | 170 | 167 | 166 | 169 | 160 | 165 |
| 19000 | Mw × $10^{-3}$ | 90 | 92 | 99 | 89 | 91 | 90 | 85 | 81 | 55 |
| | Conversion (%) | 89 | 87 | 80 | 88 | 90 | 87 | 85 | 80 | 75 |
| | Tm (°C.) | 170 | 170 | 169 | 166 | 165 | 170 | 169 | 169 | 168 |

(Note *1)
Mw: Weight average molecular weight of polymer (excepting low molecular weight compound) (same as the average molecular weight in the present invention)
(Note *2)
Tm: Melting point of polymer (chip)

It is found from Table 3 that there is a tendency that the smaller the molecular weight of PEG is, the more the degree of polymerization is hard to increase. In case of PEG having a number average molecular weight of 600, it is difficult to obtain a copolymer having an average molecular weight of not less than 50,000 when the copolymerization proportion is not less than 3%. Similarly in case of PEG having number average molecular weights of 1,000, 3,500, 8,200 and 10,500, it is difficult to obtain high molecular weight copolymers when the copolymerization proportions are not less than 6%, 8%, 10% and 12%, respectively.

Fibers obtained from the copolymers containing 1% of PEG having a number average molecular weight of 1,000, 3,500, 8,200 or 10,500 were immersed in activated sludge for six months, and the strength thereof was measured. The strength was all not more than ½, thus showing a good biodegradability.

EXAMPLE 3

PEG having a number average molecular weight of 1,000 was copolymerized with lactide at a copolymerization proportions of 3% and 6% respectively in the same manner as in Example 2 except that 0.44% and 0.9% (equimolar with PEG component) phthalic anhydride were charged and reacted respectively based on the polymerization system through the first vent hole of the second twin-screw kneader.

The average molecular weight of the obtained copolymers is as shown in Table 4, and an effect enhancing the degree of polymerization based on a balance in end groups is recognized.

The fibers prepared from the obtained copolymers were allowed to stand in the ground for six months, and the appearance thereof was observed. There were observed voids in part and changes such as swelling and tearing. The strength of the fibers immersed in activated sludge was not more than ½, thus showing a good biodegradability.

TABLE 4

| Polymerization manner | Measured value | Proportion of PEG in copolymerization (%) | |
|---|---|---|---|
| | | 3 | 6 |
| Addition of phthalic anhydride | Mw × $10^{-3}$ | 82 | 65 |
| | Conversion (%) | 83 | 77 |
| | Tm (°C.) | 165 | 163 |
| No use of phthalic anhydride | Mw × $10^{-3}$ | 51 | 26 |
| | Conversion (%) | 83 | 70 |
| | Tm (°C.) | 165 | 165 |

EXAMPLE 4

L-lactide having an optical purity of 99.8%, dried sufficiently (water content not more than 100 ppm) and premelted, and a polyethylene adipate having a weight average molecular weight of 3,000, to which 0.1% of Irganox 1010 made by Ciba Geigy Corp., i.e. a hindered phenol antioxidant, were supplied in a polymerization ratio of 98/2 to the raw material feed part of a twin-screw kneader. At the same time, a tin dioctylate was added, as the polymerization catalyst, in an amount of 0.3% based on the lactide.

The twin-screw kneader is one shown in FIGS. 2 and 3, and comprises plural 30 mm diameter feed screws and plural 7 mm thick two blade-shaped agitating elements. The feed screws were disposed in the raw material feed part and the two vent hole parts, and the agitation elements were disposed in the other parts. The section of the cylinder was elliptic and constricted around its center portion. The temperature was set at 192° C. A nitrogen gas was supplied through the first vent hole and exhausted through the second vent hole. Two rotation shafts were rotated in the same direction, and the number of rotations was 50/min.

The polymer discharged from the twin-screw kneader was then supplied to a 30 mm diameter second twin-screw kneader directly connected thereto and provided with two vent holes. The cylinder temperature was 185° C. The rotation was in the same direction, and the number of rotations was 40/min. A nitrogen gas was supplied through the first vent hole, and the second vent hole was connected to a vacuum pump. The vacuum degree was kept at about 10 Torr, and the above-mentioned antioxidant was added in an amount of 0.1% based on the polymer. The polymer discharged from the second twin-screw kneader was pressure-sent with a gear pump, filtered with a 20 μm filter, extruded through a 3 mm diameter nozzle, cooled with water to solidify, and cut to obtain chips P4. The average residence (reaction) time of the polymer in the first twin-screw kneader was six minutes, and the residence time in the second twin-screw kneader was eight minutes. The total average polymerization time was 14 minutes. P4 had no discoloration and was excellent in transparency.

melting point of the obtained copolymers are shown in Table 5. The polymerization conversion is the weight percentage of a high molecular weight component having a molecular weight exceeding 500, that is to say, one excluding a low molecular weight component such as a residual monomer in the polymer. The melting point of the polymer was measured with the use of the obtained chips by the DSC method. Though there is a case where the melting point is somewhat lower (about 2° to about 7° C.) than that of the drawn and oriented fiber, they are nearly approximate values. The proportion in copolymerization in the Table indicates the compositions of raw materials charged.

TABLE 5

| Sample No. | Polyester*[1] | | | | Produced polymer | | |
|---|---|---|---|---|---|---|---|
| | n | m | p | Amount (%) | Tm (°C.) | η rel | Spinning property |
| 1 | 2 | 2 | 20 | 0 | 173 | 2.5 | yarn breaking during spinning, whitening during drawing |
| 2 | ↑ | ↑ | ↑ | 0.5 | 173 | 3.4 | good |
| 3 | ↑ | ↑ | ↑ | 3 | 170 | 3.1 | good |
| 4 | ↑ | ↑ | ↑ | 5 | 165 | 2.9 | nearly good |
| 5 | ↑ | ↑ | ↑ | 10 | 160 | 2.7 | nearly good |
| 6 | ↑ | ↑ | ↑ | 15 | 150 | 2.5 | yarn breaking sometimes during spinning |
| 7 | 4 | 2 | 40 | 0.5 | 172 | 3.2 | good |
| 8 | ↑ | ↑ | ↑ | 3 | 170 | 3.6 | good |
| 9 | ↑ | ↑ | ↑ | 5 | 163 | 3.2 | good |
| 10 | ↑ | ↑ | ↑ | 10 | 157 | 3.0 | good |
| 11 | ↑ | ↑ | ↑ | 15 | 150 | 2.7 | yarn breaking sometimes during spinning |
| 12 | 4 | 4 | 20 | 0.5 | 173 | 3.5 | good |
| 13 | ↑ | ↑ | ↑ | 3 | 171 | 3.7 | good |
| 14 | ↑ | ↑ | ↑ | 5 | 168 | 3.4 | good |
| 15 | ↑ | ↑ | ↑ | 10 | 160 | 3.2 | good |
| 16 | ↑ | ↑ | ↑ | 15 | 151 | 2.9 | yarn breaking sometimes during spinning |
| 17 | 6 | 4 | 70 | 0.5 | 173 | 2.9 | yarn breaking sometimes during spinning |
| 18 | ↑ | ↑ | ↑ | 3 | 171 | 3.2 | nearly good |
| 19 | ↑ | ↑ | ↑ | 5 | 169 | 3.3 | nearly good |
| 20 | ↑ | ↑ | ↑ | 10 | 165 | 2.8 | yarn breaking sometimes during spinning |
| 21 | ↑ | ↑ | ↑ | 15 | 148 | 2.4 | yarn breaking sometimes during spinning |

(Note *[1])
$H[O(CH_2)_nOOC(CH_2)_mCOO]_pH$

P4 was melted by a 210° C. screw extruder, spun through an orifice of 200° C. having 0.2 mm diameter holes, and cooled in air, followed by oiling and winding at a speed of 1,000 m/min, to give an un-drawn yarn UY4. UY4 was drawn at 70° C. in a drawing ratio of 3.3, heat-treated under a tension at 115° C., and wound at a speed of 800 m/min to give a drawn yarn DY4 of 150 d/48 f.

Spinning and drawing were carried out without yarn breaking, thus the workability was excellent. Physical properties of the drawn yarn were strength of 3.6 g/d, elongation of 35% and Young's modulus of 670 kg/mm$^2$, and the transparency thereof was excellent.

The strength of DY4 after immersed in activated sludge for six months was not more than ¼, thus showing a good biodegradability.

EXAMPLE 5

Aliphatic polyesters having various molecular weights were copolymerized with lactides in various ratios in nearly the same manner as in Example 4. The proportion of aliphatic polyester in copolymerization conversion, and the average molecular weight, polymerization conversion and

EXAMPLE 6 AND COMPARATIVE EXAMPLE 3

In the following Example, a strength deterioration test of fibers was conducted in the manner mentioned below.

Continuous filaments of 150 d/48 f (single filament 3.1 d) were used as a sample fiber, and wound and fixed under a tension (tension of about 20 mg/d) on a 10 cm wide rectangular frame made by bending a 6 mm diameter stainless steel bar. A sample fiber to be compared was wound 1 cm apart from the mentioned sample in the same manner. The stainless steel frame with the samples (yarns) wound thereon was embedded horizontally in the fertile neutral soil (pH 6.5 to 7.0) 10 cm deep from the ground under a victoria lawn for agriculture. Attention was paid so that the soil did not become excessively dry and wet (shaded area where grasses are growing and in the state that the surface of the ground is always wet). The temperature was kept within the range of 25°±5° C.

The samples were taken out every specified period, for instance, every one week or every one month, and after washing with water and air drying, three filaments were sampled from each of the samples. The tensile test was conducted with respect to the filament. The length of the test specimen was 5 cm and the rate of tension was 5 cm/min.

The strength at breaking was measured, and the average value of ten measurements was assumed to be a central value. The temperature of a testing room for the tensile test was 20° C., and the humidity was 65% RH.

From a curve on the relationship between the embedded period and the tensile strength at breaking, the time period until the strength decreases to ½ of the initial strength (not deteriorated), was obtained as the half-life. It is shown that the smaller the half-life is, the faster the deterioration (degradation) speed is.

Bishydroxyethyl sodium sulfoisophthalate, bishydroxyethyl isophthalate and bishydroxyethyl adipate were mixed in a molar ratio of 2.10/1.00/1.00, and reacted at 260° C. under normal pressure for one hour. The pressure was then reduced gradually over 15 minutes to a degree of vacuum of 0.1 Torr and was kept for 17 minutes to give a prepolymer PP1. The weight average molecular weight of PP1 was about 9,000. The melting point thereof was unable to determine because of low crystallinity. The content of the sulfoisophthalic acid component was about 51%.

L-lactide was melt-mixed with PP1 in an amount of 18 parts per 1 part of PP1, and 0.3% of tin dioctylate was added as a polymerization catalyst. The mixture was polymerized at 190° C. for 35 minutes with agitating by means of a twin-screw kneader, extruded through a 2 mm diameter nozzle, cooled with water and then cut to obtain chips C1. After centrifugally dehydrated, C1 was vacuum-dried at 80° C. for 48 hours under not more than 0.1 Torr to remove water and the residual monomer (lactide) to give a copolymer P5.

P5 had an average molecular weight of 155,000, melting point of 173° C. and a content (copolymerization proportion) of the sulfoisophthalic acid component of 3%.

For comparison purpose, L-lactide was polymerized alone using 0.3% of tin dioctylate in the same manner as in P5 and was formed into chips to give a polylactic acid (homopolymer) P6. The average molecular weight of P6 was 62,000, and the melting point was 175° C.

P5 was melted at 200° C. by a screw extruder, spun through an orifice of 190° C. with 0.2 mm diameter holes, and cooled in air, followed by oiling and winding at a speed of 800 mm/min to give an un-drawn yarn UY5. UY5 was drawn at 70° C. in a ratio of 4.2, and then heat-treated at 120° C. under a tension to give a drawn yarn DY5 of 150 d/48 f. The strength of DY5 was 4.4 g/d, and the elongation was 29.3%.

Also the drawn yarn DY6 was prepared by spinning P6 at 195° C., and drawing and heat-treating in the same manner as in P5. The strength of DY6 was 3.2 g/d, and the elongation was 25.6%.

DY5 and DY6 were embedded in soil to carry out a deterioration test. As a result, the half-life of the strength deterioration of DY5 obtained from the copolymer of the present invention was 2.1 months. In contrast, the half-life of DY6 (Comparative Example 3) made of the un-modified polylactic acid was 7.6 months. The degradation speed of DY5 in which 3% sulfoisophthalic acid component was copolymerized, was about 3.6 times that of the un-modified DY6.

A dyeing solution was prepared in a usual manner using a basic dye Kayacrl Blue 2RL-ED 5.0% owf, and a circular-knitted fabric knitted with DY5 yarn was dyed at a bath ratio of 50 by heating up the solution from 25° to 95° C. over 30 minutes and further heating at 95° C. for 30 minutes. The percentage of exhaustion of the dye was 94.7%, and the yarn was vividly dyed. After washing with water and drying, the color fastness after cleaning was measured. Both the change in color and the solution contamination were in the grade 4 to 5, thus the yarn had a sufficient fastness.

For comparison purpose, the dyeing with the basic dye was conducted in the same manner by using DY6. The percentage of dye exhaustion was only 10.5%, so the dyed DY6 was merely in such a state as being contaminated.

Then a dyeing solution was prepared in a usual manner using a disperse dye, Miketon Polyester Blue 2.5% owf, and dyeing was carried out at a bath ratio of 50 by heating up the solution from 25° C. to 95° C. over 30 minutes and further heating at 95° C. for 30 minutes. The percentage of dye absorption was 25.0%, and the dyeing color was light. The change in color after cleaning was in the grade 1 to 2, and the color fastness was poor.

Reference Examples 1 to 3

Poly-L-lactic acid was prepared by melt-polymerization of an L-lactide as a raw material which was synthesized from L-lactic acid, and poly-D/L-lactic acid copolymers were prepared by copolymerizing L-lactic acid and D-lactic acid in a predetermined ratio. Melt-adhesive polylactic acid conjugate fibers of 3 d was prepared by suitably selecting polylactic acids having melting points as shown in Table 6 as a polymer (a) and a polymer (b), from the obtained poly-L-lactic acid and various kinds of poly-D/L-lactic acid copolymers, and spinning a conjugate fiber of a parallel type (side-by-side type, the same shape as in FIG. 13) comprising the polymer (a) and the polymer (b) in a ratio of 4/1, followed by drawing and heat-treating.

These conjugate fibers were formed into cut fibers and then crimped, and therefrom non-woven fabrics were prepared and evaluated. Binding of the non-woven fabrics was conducted by heat-embossing. The embossing temperature was suitably set in the range lower than the melting points of the polymer (a) as shown in Table 6. The results are shown in Table 6.

The "tensile strength" in Table 6 are values measured by deforming 50 mm wide strip-like test specimens at a rate of extension of 200%/min. The values in the table are shown by the range of actually measured values of ten specimens.

The obtained non-woven fabrics were embedded in the soil mentioned before (Example 6) for six months, and the change in shape was observed. There was observed cracking and the like on the fibers, and the tensile strength was at most 1 kg. Thus biodegradability was confirmed.

Comparative Reference Examples 1 and 2

Polylactic acid conjugate fibers were prepared in the same manner as in Reference Example 1 except that polylactic acid polymers, of which difference in the melting point is less than 10° C., were selected as the polymers (a) and (b). Then the non-woven fabrics were prepared and evaluated. The results are shown in Table 6.

From Table 6 it is seen that the heat embossing effect is small and the obtained non-woven fabrics are inferior in physical properties.

TABLE 6

| Items | Reference Example 1 | Reference Example 2 | Reference Example 3 | Comparative Reference Example 1 | Comparative Reference Example 2 |
|---|---|---|---|---|---|
| Polymer (a) | | | | | |
| Melting point (°C.) | 170 | 178 | 130 | 175 | 100 |
| Proportion of D-lactic acid (mole %) | 1 | 0 | 5 | 0 | 10 |
| Polymer (b) | | | | | |
| Melting point (°C.) | 130 | ND*1 | ND | 168 | 95*3 |
| Proportion of D-lactic acid (mole %) | 5 | 15 | 15 | 1 | 12 |
| Embossing temperature (°C.) | 150 | 100 | 70 | 172 | 97 |
| Tensile strength (kg) | 4 to 9 | 3 to 8 | 5 to 11 | 1 to 5 | not more than 1 |
| Appearance of non-woven fabric | good | good | surface wrinkle | fuzz | wrinkle, fuzz |
| Weight per square meter of non-woven fabric (g/m$^2$) | 43 | 45 | 52 | 49 | 46 |
| Polymer (a)/(b) ratio | 50/50 | 60/40 | 70/30 | 50/50 | 50/50 |
| Over-all estimation*2 | ◉ | ◉ | ○–◉ | Δ | Δ |

(Notes)
*1ND: Amorphous and having no melting point
*2◉: Very excellent, ○: Excellent, Δ: Inferior
*3Showing somewhat vague melting point Reference Examples 4 to 6

The same polylactic acid polymers as in Reference Examples 1 to 3 were used as polymers (a) and (b), and conjugate fibers were prepared to have a transverse cross sectional structure as shown in FIG. 5 instead of the parallel type structure, thus giving melt-adhesive core-sheath conjugate fibers (3 d) including a core made of the polymer (a) having a higher melting point and a sheath made of the polymer (b) having a lower melting point in a polymers (a)/(b) ratio of 2/1. Subsequently non-woven fabrics were prepared in the same manner as in Reference Example 1, and evaluated. The results are shown in Table 7.

Comparative Reference Examples 3 and 4

The same polylactic acid polymers as in Comparative Reference Examples 1 and 2 were used as polymers (a) and (b), and conjugate fibers were prepared, to have a transverse cross sectional structure of a core sheath type instead of the parallel type structure, thus giving core-sheath conjugate fibers including a core made of the polymer (a) having a higher melting point and a sheath made of the polymer (b) having a lower melting point. Subsequently the non-woven fabrics were prepared in the same manner as in Reference Example 1, and evaluated. The results are shown in Table 7.

TABLE 7

| Items | Reference Example 4 | Reference Example 5 | Reference Example 6 | Comparative Reference Example 3 | Comparative Reference Example 4 |
|---|---|---|---|---|---|
| Melting point of polymer (a) (°C.) | 170 | 178 | 130 | 175 | 100 |
| Melting point of polymer (b) (°C.) | 130 | ND | ND | 168 | 95 |
| Embossing temperature (°C.) | 150 | 100 | 80 | 172 | 97 |
| Tensile strength (kg) | 5 to 8 | 4 to 6 | 3 to 8 | not more than 1 | not more than 1 |
| Appearance of non-woven fabric | good | good | good | fuzz | wrinkle |
| Weight per square meter of non-woven fabric (g/cm$^2$) | 50 | 45 | 49 | 47 | 53 |
| Polymer (a)/(b) ratio | 60/40 | 60/40 | 60/40 | 60/40 | 50/50 |
| Over-all estimation | ◉ | ◉ | ◉ | Δ | Δ |

EXAMPLES 7 AND 8 AND REFERENCE EXAMPLES 7 AND 9

L-lactide was copolymerized with a compound having polyfunctional groups (glycerol (GLC), polyethylene glycol (PEG having a number average molecular weight of 8,200)) or DL-lactide in a proportion as shown in Table 8 to give various polylactic acid polymers having different melting points. From the obtained polylactic acid polymers were suitably selected those having the melting points as shown in Table 8 as the polymers (a) and (b), and conjugate fibers (3 d) having a core-sheath type or side-by-side type (same shape as in FIG. 13) transverse cross sectional structure and a polymer (a) /polymer (b) ratio of 4/1 were melt-spun. The obtained conjugate fibers were melt-adhesive polylactic acid-based fibers. Subsequently non-woven fabrics were prepared in the same manner as in Reference Example 1, and evaluated. The results are shown in Table 8.

TABLE 8

| Items | Reference Example 7 | Reference Example 8 | Example 7 | Example 8 | Reference Example 9 |
|---|---|---|---|---|---|
| Polymer (a) | | | | | |
| Melting point (°C.) | 173 | 172 | 169 | 167 | 177 |
| Proportion of comonomer (%) | GLC 1 | GLC 2 | PEG 1 | PEG 3 | none 0 |
| Polymer (b) | | | | | |
| Melting point (°C.) | 128 | 100* | 100* | 150 | 167 |
| Proportion of comonomer (%) | DL-lactide 10 | DL-lactide 20 | DL-lactide 20 | DL-lactide 4 | PEG 3 |
| Kind of composite fiber | core-sheath type | core-sheath type | parallel type | parallel type | core-sheath type |
| Embossing temperature (°C.) | 140 | 110 | 100 | 160 | 170 |
| Tensile strength (kg) | 5 to 8 | 5 to 9 | 4 to 8 | 2 to 5 | 5 to 10 |
| Appearance of non-woven fabric | good | good | good | good | good |
| Weight per square meter of non-woven fabric (g/cm²) | 44 | 50 | 47 | 51 | 46 |
| Polymer (a)/(b) ratio | 60/40 | 50/50 | 50/50 | 40/60 | 30/70 |
| Over-all estimation | ⊚ | ⊚ | ○–⊚ | ○–⊚ | ⊚ |

(Notes)
*Showing somewhat vague melting point

Reference Examples 10 to 13

L-lactide was copolymerized with glycerol (GLC), DL-lactide or PEG (number average molecular weight 8,200) in the ratio shown in Table 9 to give polymers (a) and (b) having the melting points shown in Table 9. Core-sheath type composite filament yarns comprising the polymers (a) and (b) were then prepared. The obtained core-sheath composite filament yarns were melt-adhesive polylactic acid fibers having properties as shown in Table 9. The obtained melt-adhesive polylactic acid fibers were woven in a low density plain gauze, and then passed through heat calender rolls of 120° C. Thus a plain gauze well secured by fusion which has a 0.1 to 5 mm mesh spacing was obtained, and evaluated. The results are as shown in Table 9. The plain gauze was very suitable as food packaging materials such as tea bags.

When the obtained plain gauze was immersed in activated sludge for 6 months, the strength against mesh slippage was not more than 0.1 kg and the strength of the fiber itself became not more than ½. Thus a good biodegradability was observed.

The "strength against mesh slippage" in Table 9 indicates a lower limit strength reaching separation of warp and weft when the plain gauze having a 0.2 mm mesh spacing was cut at an angle of nearly 45° to the warp and weft into strip-like 5 cm wide samples and deformed by means of a tension tester.

Comparative Reference Example 5

A core-sheath type conjugate fiber having properties as shown in Table 9 was prepared by using the same polylactic acid polymers as used in Comparative Reference Example 3, as the polymers (a) and (b). Subsequently a plain gauze was prepared in the same manner as in Reference Examples 10 to 13, and evaluated. The results are as shown in Table 9. The obtained plain gauze was one not suitable for food packaging materials such as tea bags.

TABLE 9

| Items | Reference Example 10 | Reference Example 11 | Reference Example 12 | Reference Example 13 | Comparative Reference Example 5 |
|---|---|---|---|---|---|
| Polymer (a) | | | | | |
| Melting point (°C.) | 173 | 170 | 178 | 177 | 175 |
| Proportion of comonomer (%) | GLC 1 | GLC 3 | — | — | — |
| Polymer (b) | | | | | |
| Melting point (°C.) | 128 | 130 | ND*[1] | 167 | 168 |
| Proportion of comonomer (%) | DL-lactide 10 | DL-lactide 8 | DL-lactide 24 | PEG 5 | DL-lactide 2 |
| Polymer (a)/(b) ratio | 60/40 | 70/30 | 50/50 | 40/60 | 60/40 |
| Fineness (d) | 24 | 36 | 75 | 24 | 36 |
| Yarn strength (g/d) | 3 to 5 | 4 to 6 | 3 to 4 | 3 to 5 | 4 to 6 |
| Elongation (%) | 35 to 50 | 35 to 60 | 33 to 45 | 30 to 60 | 25 to 60 |
| Strength against | not less | not less | 1 to 1.8 | 0.5 to 1 | not more |

TABLE 9-continued

| Items | Reference Example 10 | Reference Example 11 | Reference Example 12 | Reference Example 13 | Comparative Reference Example 5 |
|---|---|---|---|---|---|
| mesh slippage (kg) | than 3 | than 3 | | | than 0.1 |
| Performance as tea bag*² | ⊙ | ⊙ | ⊙ | ○–⊙ | Δ |

(Notes)
*¹ND: Amorphous and having no melting point
*²⊙: Very excellent, ○: Excellent, Δ: Inferior Reference Examples 14 and 15 and Comparative Reference Examples 6 and 7

Sufficiently dried L-lactide having an optical purity of not less than 99.9% was polymerized, by using a twin-screw kneader, with agitating at 190° C. for 35 minutes in the presence of 0.3% of tin dioctylate as the polymerization catalyst, 0.1% of Irganox 1010 made by Ciba Geigy Corp. as the antioxidant, and, as a fluidity modifying and water repellent agent, 0.3% of magnesium stearate and 0.5% of polyethylene oxide (acid number 15) having a molecular weight of 4,000. After the polymerization, the obtained polymer was extruded through a 3 mm diameter nozzle, cooled with water and cut into chips. The obtained chips, after centrifugally dehydrated, were dried at 90° C. for 48 hours at a vacuum degree of not more than 0.1 Torr with a vacuum dryer to remove residual lactides. Thus the polylactic acid P7 having an average molecular weight of 162,000 and an optical purity of not less than 99.9% was obtained.

The polylactic acid copolymer P8 having an average molecular weight of 156,000 and an L/D of 95/5 was obtained in nearly the same manner as in P7 except that the mixture of 95 parts of L-lactide and 5 parts of D-lactide were used as monomers and the fluidity modifying and water repellent agents were not used.

P7 was melted at 200° C. by using a screw extruder, spun through an orifice of 195° C. with 0.2 mm diameter holes and cooled in air, followed by oiling and winding at a speed of 800 m/min to give an un-drawn yarn UY7. UY7 was then drawn at a drawing temperature of 70° C. in the drawing ratio of 4.1, and heat-treated at 120° C. under tension to give a drawn yarn DY7 of 150 d/48 f. DY7 had a strength of 4.1 g/d, an elongation of 32.0%, an initial elastic modulus (Young's modulus) of 63.6 g/d, an average molecular weight of 108000, and a melting point of 173° C.

The drawn yarn DY8 obtained from P8 by spinning and drawing in the same manner as in DY7 had physical properties; strength 3.1 g/d, elongation 43.1%, initial elastic modulus 36.6 g/d, average molecular weight 87,000, and melting point 151° C.

P7 and P8 were melted respectively with separate screw extruders, and spun through an orifice of 195° C. with 0.2 mm diameter holes to conjugate into a concentric core-sheath type structure with P7 as the sheath and P8 as the core in the P7/P8 volume ratio of 1/1. Then the spinning and drawing were conducted in the same manner as in DY7 to give a drawn yarn DY9. DY9 had physical properties: strength 3.6 g/d, elongation 40.1%, initial elastic modulus 57.4 g/d, and average molecular weight 96,000.

A drawn yarn DY10 was obtained by conducting the bi-component fiber spinning and the drawing in nearly the same manner as in DY9 except that the P7/P8 conjugation ratio (volume) was 1/2. The DY10 had physical properties: strength 3.5 g/d, elongation 31%, initial elastic modulus 51 g/d, and average molecular weight 92,000.

The deterioration test was carried out by embedding DY7, DY8, DY9 and DY10 in the soil for two years. The strength retention after each embedded period of time of each yarn is shown in Table 10.

TABLE 10

| Months embedded (month) | Comparative Reference Example 6 | Comparative Reference Example 7 | Reference Example 14 | Reference Example 15 |
|---|---|---|---|---|
| 0 | 100 | 100 | 100 | 100 |
| 1 | 95.3 | 86.3 | 95.5 | 96.0 |
| 2 | 95.0 | 71.0 | 93.7 | 94.8 |
| 3 | 91.1 | 59.6 | 92.0 | 92.2 |
| 4 | 88.7 | 38.1 | 85.6 | 86.4 |
| 5 | 83.5 | 20.2 | 85.2 | 84.3 |
| 6 | 79.2 | 11.5 | 80.3 | 81.5 |
| 8 | 75.0 | 0 | 73.8 | 70.0 |
| 10 | 69.3 | | 66.5 | 42.2 |
| 12 | 61.7 | | 60.2 | 18.4 |
| 14 | 55.6 | | 45.4 | 8.7 |
| 16 | 48.0 | | 28.9 | 0.0 |
| 18 | 43.0 | | 9.9 | |
| 20 | 38.7 | | 5.2 | |
| 22 | 32.5 | | 0.0 | |
| 24 | 30.1 | | | |
| Note | Single-component fiber DY7 | Single-component fiber DY8 | Bi-component conjugate fiber DY9 | Bi-component conjugate fiber DY10 |

As shown in Table 10, the estimated half-life of DY7 comprising a slightly degradable polyester was about 15 months, and the half-life of DY8 comprising an easily degradable polyester was about three months. On the other hand, the deterioration of DY9 composed of the both polymers formed in the sheath/core ratio of 1/1 proceeded rapidly after a lapse of 12 months, and the half-life thereof was 14 months. As regards DY10 formed in the sheath/core ratio of 1/2, the deterioration thereof proceeded rapidly after a lapse of eight months, and the half-life thereof was about nine months. DY7 and DY8 each comprising a single component deteriorate nearly linearly, but each of the conjugate fibers of the present invention has the feature that the deterioration proceeds slowly during the specified period of time, and after a lapse of such a period, proceeds rapidly. The fibers prepared by mixing P7 with P8 and then spinning show, in many cases, a linear deterioration characteristic though the characteristic varies depending on the mixing condition, and does not show such a peculiar deterioration behavior as in the conjugate fibers of the present invention.

EXAMPLE 9

Dimethyl terephthalate and butandiol were reacted in the molar ratio of 1/2.2 for trans-esterification with stirring at 180° C. for about two hours, using 200 ppm of sodium acetate as the trans-esterification catalyst. The resultant was then mixed with 20% of polyhexane adipate having a weight average molecular weight of 600 and 250 ppm of antimony trioxide as the polymerization catalyst based on the butylene terephthalate component. With agitating at 240° C. for one hour, the pressure was gradually decreased from 600 Torr up to 0.5 Torr, and the polymerization was further carried out at 0.5 Torr for about four hours to give a polybutylene terephthalate (PBT)/polyhexane adipate (PHA) copolymer P9. The P9 was mainly a block copolymer of PBT/PHA, but a part thereof was in the state of random copolymer owing to the trans-esterification reaction.

A polylactic acid/PEG block copolymer P10 was obtained in nearly the same manner as in the polymerization with a lactide in Reference Example 14 except that 2.5% of polyethylene glycol (PEG) having a number average molecular weight of 6,300 was mixed to the polymerization system and reacted.

P9 was spun and drawn in the same manner as in DY7 in Comparative Reference Example 6, to give a drawn yarn DY11. The DY11 had physical properties: strength 3.6 g/d, elongation 58.0%, initial elastic modulus 28.6 g/d, fineness 3 d, weight average molecular weight 46,000, and melting point 231° C.

Similarly P10 was spun and drawn in the same manner to give a drawn yarn DY12. DY12 had physical properties: strength 4.3 g/d, elongation 33.1%, initial elastic modulus 59.4 g/d, fineness 3 d, average molecular weight 97,000, and melting point 171° C.

P9 as the sheath component and P10 as the core component were melted by a screw extruder in the same manner as in DY9 of Reference Example 14, and formed into the concentric composite core-sheath type in the P9/P10 ratio of 1/2 to give a drawn yarn DY13. DY13 had physical properties: strength 4.1 g/d, elongation 36.1%, initial elastic modulus 58.0 g/d, and the fineness 3 d.

DY11, DY12 and DY13 were embedded in soils for three years to carry out a deterioration test. As a result, the half-life of DY11 was about three years. The half-life of DY12 was about six months and the deterioration thereof proceeded nearly linearly. On the other hand, the deterioration of the conjugate fiber DY13 proceeded slowly until 24 months and after that rapidly advanced. The half-life was 27 months.

EXAMPLE 10

A copolymer of L-lactide and 2.5% of PEG having a number average molecular weight of 8,200 (easily degradable polymer 1) having a melting point of 166° C. and an average molecular weight of 180,000, and a PBT (aromatic component 67%, melting point (220° C.)) having a number average molecular weight of 19,000, were melt-spun at 235° C. in a bi-component fiber spinning manner, followed by cooling in air, oiling, winding at a speed of 1,200 m/min, drawing 3.94 times at 80° C., and then heat-treating at 130° C. under tension, to give a drawn yarn Y1 of 150 d/48 f. The transverse sectional structure of Y1 was of radial type as shown in FIG. 14, and the ratio (easily degradable polymer 1/aromatic polyester) was 1/5.

A circular knitted fabric knitted with Y1 was boiled in a 0.1% aqueous sodium hydroxide solution for 15 minutes, and then washed with water and dried, to give a knitted fabric K1. The easily degradable polymer 1 in Y1 was completely degraded and removed by this alkali treatment, thus the fiber became ultrafine. K1 was very soft, and had a very excellent cleaning power to wipe off a stain on the surface of a mirror, glass and the like. The rate of degradation (decrease in weight) of the easily degradable polymer 1 at 25° C. in a 0.1% aqueous sodium hydroxide solution was 10%/10 min. On the other hand, no degradation was observed on the PBT under the same conditions. The rate of degradation of this aromatic polyester was not more than 1/200 of that of the easily degradable polymer 1.

The cleaning power was measured by a method (method disclosed in Japanese Patent Publication Kokai No. 2-240566 by the present inventors) wherein a grease was uniformly applied onto a specular surface of a chrome plated metal in an mount of 1 mg/cm$^2$, wiped off once with a knit fabric, and the residual grease on the specular surface was measured by the reflection method, using a Fourier transform infrared spectrophotometer. The amount of the residual grease after wiping with K1 was 0.3 μg/cm$^2$, whereas the amount after wiping with a fabric before the alkali treatment was 33 μg/cm$^2$. That is to say, the cleaning power of K1 was increased by about 110 times by the alkali treatment (division, forming into ultrafine fiber).

EXAMPLE 11

A polylactic acid copolymer (easily degradable polymer 2) having an average molecular weight of 180,000 and a melting point of 161° C. which was prepared by copolymerizing a mixture of L-lactide and DL-lactide in an L-lactic acid/D-lactic acid ratio of 97/3 with 2% of polyethylene glycol having a number average molecular weight of 8,200 based on the lactic acid component, and an aromatic polyester prepared by copolymerizing PBT with 15 % of polybutylene adipate and having a weight average molecular weight of 22,000, a melting point of 194° C. and an aromatic component content of 57% were spun, drawn and heat-treated in the same manner as in Y1 of Example 10, to give a drawn yarn Y2.

A knit fabric made of Y2 was boiled in an aqueous sodium carbonate solution (3%) for 15 minutes, followed by washing with water and drying to give a knit fabric K2. By this weak alkali treatment, the easily degradable polymer 2 in Y2 was completely degraded and removed, so the fiber became ultrafine. K2 was very soft and excellent in cleaning power, like K1 of Example 10.

Conventional conjugate fibers could not be divided with weak alkalis such as sodium carbonate. The rate of degradation of the easily degradable polymer 2 at 25° C. in a 0.1% aqueous sodium hydroxide solution was 15%/10 min., whereas that of the PBT/polybutylene adipate copolymer under the same conditions was 0.1%/10 min. That is to say, the hydrolysis rate of the aromatic polyester constituting Y2 was 1/150 of the easily degradable polymer 2.

EXAMPLE 12 AND COMPARATIVE EXAMPLE 4

L-lactide having the optical purity of 99.7% and sufficiently dried (water content not more than 90 ppm) and pre-melted and the similarly dried and melted PEG (#6000 made by Nippon Oil & Fats Co., Ltd.) having the number average molecular weight of 8,200, to which 0.1% of Irganox 1010 made by Ciba Geigy Corp., i.e. a hindered phenol antioxidant was added, were supplied to the raw material feed part of a twin-screw kneader in the ratio of 98/2. Simultaneously tin dioctylate was added as the polymerization catalyst in an amount of 0.3% based on the lactide. The twin-screw kneader was one shown in FIGS. 1 and 2 and comprised plural 30 mm diameter feed screws and plural 7 mm thick two blade-shaped agitating elements.

The feed screws were disposed in the raw material feed part and two vent hole parts, and the agitating elements, in the other parts. The section of the cylinder was elliptic and constricted around the center portion, and its temperature was set at 190° C. A nitrogen gas was supplied through the first vent hole and exhausted through the second vent hole. The two rotation shafts rotated in the same direction, and the number of rotations was 60/min.

The polymer discharged from the twin-screw kneader was supplied to the 25 mm diameter second twin-screw kneader directly connected thereto and having two vent holes. The cylinder temperature was set at 190° C. The rotation was in the same direction, and the number of rotations was 40/min. A small amount of nitrogen gas was supplied through the first vent hole, and the second vent hole was connected to the vacuum pump. The vacuum degree was kept at about 0.5 Torr, and the above-mentioned antioxidant was added in an amount of 0.1% based on the polymer. The average residence (reaction) time in the first twin-screw kneader was 5.5 minutes, and the residence time in the second twin-screw kneader was 12 minutes. The total average polymerization time was 17.5 minutes.

The polymer discharged from the second twin-screw kneader was pressure-sent with a gear pump, and filtered through a 20 μm filter, and then sent to the spinning head kept at 190° C. The spinning head was provided with two spinnerets each having 24 small holes of 0.25 mm in diameter. The spinning condition was good, and the filaments sufficiently cooled and solidified were wound as the un-drawn yarn at a rate of 1,000 m/min. The average molecular weight of the copolymer entering the spinning head was 90,000.

Drawing was carried out at a drawing temperature of 70° C. in a drawing ratio of 3.8, and heat-treatment after the drawing was continuously carried out at 120° C. The drawing was conducted satisfactorily without yarn breaking, thus giving a very good fiber having a strength of 4.2 g/d, an elongation of 33.2%, a fiber melting point of 173° C. and a heat of fusion of 10.8 cal/g.

EXAMPLE 13

Lactide was copolymerized with PEG having a variety of number average molecular weights in various copolymerization proportions based on the lactide in nearly the same manner as in Example 12, and directly spun immediately after the polymerization. The spinning and drawing were conducted under the same conditions as in Example 10.

The physical properties of the obtained fiber are shown in Table 11.

TABLE 11

| | PEG | | Physical properties of fiber | | | | | |
|---|---|---|---|---|---|---|---|---|
| No. | Number average molecular weight | Addition percent | Average molecular weight | Strength (g/d) | Elongation (%) | Melting point (°C.) | Heat of fusion (cal/g) | Degree of orientation (%) |
| 1 | 1000 | 1.5 | 76000 | 3.8 | 36 | 173 | 10.3 | |
| 2 | 2000 | 1.5 | 82000 | 4.1 | 34 | 174 | 10.7 | |
| 3 | 3500 | 2.5 | 88000 | 4.3 | 32 | 174 | 11.3 | 85 |
| 4 | 6000 | 2.5 | 95000 | 4.8 | 36 | 173 | 10.4 | 87 |
| 5 | 6000 | 4.0 | 91000 | 4.7 | 35 | 173 | 9.8 | |
| 6 | 8200 | 2.5 | 107000 | 5.5 | 36 | 172 | 10.3 | 92 |
| 7 | 8200 | 6.0 | 97000 | 5.1 | 34 | 173 | 9.5 | |
| 8 | 12000 | 4.0 | 96000 | 4.7 | 32 | 174 | 11.2 | |

EXAMPLE 14 AND COMPARATIVE EXAMPLE 5

PEG (#6000 made by Nippon Oil & Fats Co., Ltd.) having a number average molecular weight of 8,200 was added in an amount of 2% based on a lactide sufficiently dried (water content not more than 100 ppm) and pre-melted and having an optical purity of 99.8%, and then supplied to the raw material feed part of a twin-screw kneader. At the same time, 0.3% of tin dioctylate was added as the polymerization catalyst based on the lactide. Polymerization was carried out by the twin-screw kneader comprising plural 30 mm diameter feed screws and plural 7 mm thick two blade-shaped agitating elements. The polymerization temperature was 190° C. A nitrogen gas was supplied through the first vent hole and exhausted through the second vent hole. Two rotation shafts rotated in the same direction, and the number of rotations was 60/min.

The polymer discharged from the twin-screw kneader was sent to a 40 mm diameter second twin-screw kneader directly connected thereto and having two vent holes. The cylinder temperature was 190° C. The rotation was in the same direction, and the number of rotations was 40/min. A nitrogen gas was supplied through the first vent hole, and the second vent hole was connected to the vacuum pump to keep the vacuum degree at abut. 0.5 Torr, while the above-mentioned melted antioxidant was added in an amount of 0.1% based on the polymer. The polymer discharged from the second twin-screw kneader was pressure-sent by a gear pump, filtered with a 20 μm filter and extruded through a 3 mm diameter nozzle, followed by cooling with water to solidify and cutting to give the chips P11. The average residence (reaction) time of the polymer in the first twin-screw kneader was 5.5 minutes, and the residence time in the second twin-screw kneader was 16 minutes. The total average polymerization time was 21.5 minutes. There was no discoloration on the P11 and the transparency was excellent.

P11 was melted by a 210° C. screw extruder, spun through an orifice of 200° C. having 0.2 mm diameter holes, and cooled in air, followed by oiling and winding at a speed of 800 m/min to give an un-drawn yarn UY8. UY8 was drawn at 70° C. in a drawing ratio of 3.7, and heat-treated at 120° C. under tension, followed by winding at a speed of 600 m/min to give a drawn yarn DY14 of 75d/18f. Similarly a drawn yarn DY15 of 15d/4f was obtained.

A crimping processed yarn was prepared by applying DY14 to a disc type false-twisting machine. The overfeed ratio was 2% and the false-twisting temperature was 130° C., thus a good processed yarn having the number of twists of 2,700/m was obtained. In the same manner, two yarns each of S twist yarn and Z twist yarn were prepared.

An ester type urethane yarn of 15d/1f was elongated 4.0 times, and DY15 was covered thereon at a rate of 1,900 turns/m to give a covered yarn CV1.

The covered yarn and a raw silk of 20d/6f were knitted alternately by means of a pantyhose knitting machine (Super 4-II made by Nagata Seiki Kabushiki Kaisha having 4 ribs and 400 needles) to produce the leg portion. The panty portion was also produced using a textured yarn of 75d/18f.

After knitting, usual scouring was carried out at 60° C., and the pantyhose was fitted onto a foot pattern and set at 115° C. for finishing up. The feeling of wear was somewhat harder than that of those using nylon/urethane, but the feeling of touch was dry and fresh.

As a comparative example, a pantyhose using a nylon covered yarn CV2 and a finished yarn instead of the above-mentioned CV1 was produced. When wearing it, there was a feeling of good softness and sliminess.

EXAMPLE 15

Two kinds of pantyhoses produced in Example 14 were embedded in soil (courtyard of Gosen Kenkyusho of Kanebo, Ltd. at 4-1, Kanebo-cho Hofu-shi) at the end of August, and dug out of there every one month to observe changes in appearance and strength.

The results are shown in Table 12. The pantyhose using the lactic acid fiber decreased in strength with the lapse of time, but the pantyhose using a nylon yarn showed almost no change.

TABLE 12

| Sample | 1 month later | | 3 months later | | 6 months later | |
| --- | --- | --- | --- | --- | --- | --- |
| | Appearance | Strength | Appearance | Strength | Appearance | Strength |
| CV1 | No change | 3.4 g/d | a few wrinkles | 2.5 g/d | Cracks | 1.5 g/d |
| CV2 | No change | 5.6 g/d | No change | 5.5 g/d | No change | 5.3 g/d |

The biodegradable copolyesters of the present invention are excellent in biodegradability, toughness heat resistance, transparency and melt-fluidity, and allow to conduct melt-polymerization, melt-forming, melt-filming (film formation) and melt-spinning smoothly and high efficiently. Also the copolyesters of the present invention assure less deterioration and discoloration, and are excellent in uniformity and transparency, thus high quality molded articles, films, fibers and the like can be produced in high efficiency. In conventional methods, due to deteriorated matters and modified matters produced in the polymerization step, there generated many so-called fish eyes and mottles on the obtained products, which not only impaired the appearance but also made it impossible to conduct smooth and highly efficient production of films and fibers. The copolyesters of the present invention have made it possible for the first time to provide polymers enabling industrial production of films and fibers.

Also the copolyesters of the present invention, as compared with un-modified polylactic acid, have features such as ① a high rate of degradation, ② an excellent impact resistance and ③ an excellent dyeing property, and are widely applicable to fibers, films and molded articles. High rate of degradation is suitable for uses, for example, packaging films and other disposable articles which require early degradation. Excellent impact resistance is suitable for use in various molded articles, and excellent dyeing property is suitable for use in fibers for clothing and non-clothing uses.

Among the molded articles of the present invention, heat-adhesive polylactic acid fibers comprise conjugate fibers of polylactic acid-based polymers having different melting points and, therefore, only one polymer portion can be melted, by heating and pressing at a given temperature, to fuse the fibers together with maintaining the shape of fibers. For this reason, the use of the heat-adhesive polylactic acid fiber of the present invention can make it possible to manufacture a totally complete circulation type biodegradable non-woven fabric without a binder.

Also, when the filament yarns (heat-adhesive polylactic acid fiber) which are a molded article of the present invention, are laid crosswise at a right angle or formed into a low density woven fabric or a plain gauze and the crossing points of the yarns are melted to fuse together, an extra light weight net can be obtained as a novel completely biodegradable packaging materials. Further an air-tight cloth can be obtained by passing a knitted cloth or woven cloth through heat calender rolls to fuse surface of them.

The conjugate fibers among the molded articles of the present invention can offer a very preferable characteristic, with a high reliability, such that the deterioration of strength thereof is slow during use (also prior to use) and advances rapidly after the service life. In contrast, conventional single component type degradable fibers have a serious problem that since the deterioration thereof advances nearly linearly with the lapse of time, the advance of deterioration is remarkable even during use and therefore the service life (usable period) is not clear. Also, the deterioration advances after the service life at nearly the same speed as in use, and therefore in case of articles having a long life, matters remaining without deteriorating may cause various troubles. The conjugate fibers of the present invention can be rapidly deteriorated after used, such troubles can be prevented. Further the conjugate fibers of the present invention have a very great feature that the fibers having a wide range of degradation characteristics can be freely designed and manufactured easily in high efficiency by selecting polymers for sheath and core components, the ratio of the components and the sectional shape thereof. Also in the conjugate fibers of the present invention, the sheath portion is sufficiently drawn, and sufficiently strong adhesion between the sheath and the core can be achieved, and accordingly it is possible to prevent the sheath from being easily damaged even by an external force such as friction and from being separated from the core. This feature can be fully exhibited even in practical use, thus giving a fairly high reliability.

As to the conjugate fibers among the molded articles of the present invention, those excellent in uniformity can be produced at a high speed, thus very advantageous industrially as compared with ones produced by a conventional coating method or the like.

In the conjugate fibers among the molded articles of the present invention, an easily degradable polymer is degraded and removed in neutral environment, in weak alkali environment and by an action of organisms, so there can be obtained safely, easily and high efficiently fine fibers, ultrafine fibers, modified cross-section fibers and special section fibers. For degradation treatment and neutralization of waste water, a small amount of chemicals suffices, and organic matters in waste water can be easily and completely removed by an activated sludge process. Thus the above-mentioned conjugate fibers are very desirable from the viewpoint of environmental protection. Also they have the feature that they are divided even in the sea and soil. In that case, no special dividing step is necessary and they are expected to be applied to new uses utilizing this feature, for example, development of novel products for agricultural and fishery uses, and to novel suture.

By the process of the present invention, the number of steps is remarkably decreased as compared with conventional processes, thus biodegradable polyester fibers excellent in strength and/or heat resistance can be obtained inexpensively. In particular, a significantly epock-making effect that the molecular weight of polylactic acid polymers is hardly decreased, can be achieved by directly connecting the polymerization step and the spinning step.

INDUSTRIAL APPLICABILITY

The biodegradable copolyesters of the present invention have a biodegradability, is excellent in toughness and heat resistance, and also is less susceptible to deterioration and discoloration and excellent in uniformity, transparency and melt-fluidity. Further, the melt-polymerization can be conducted smoothly and high efficiently, and in addition, the melt-forming, melt-film formation and melt-spinning can be carried out smoothly in high efficiency. Therefore, the copolyesters are used for manufacturing molded articles, films, fibers and the like.

Also various molded articles manufactured by using the biodegradable copolyesters of the present invention having characteristics as mentioned above are suitably used in a wide range of uses and fields, for instance, general packaging and food packaging materials and agricultural materials or the like in case of films, clothing, non-clothing, medical and sanitary materials, agricultural materials, fishing lines, fishing nets, materials for general use, industrial materials or the like in case of fibers, and also in the form of knitted articles, woven articles, non-woven fabrics, paper, felts, yarns, cords, ropes and other forms.

Also the molded articles of the present invention are applicable to, for example, containers for foods and drinks, detergents and other daily necessaries, chemicals, cosmetics, and the like, parts of machines and electronic devices, furnitures, building materials, and other uses, and also can be widely used in the fields to which conventional polylactic acid homopolymer has not been applicable because of brittleness. While conventional polylactic acid/PEG copolymers are poor in strength and heat resistance, the molded articles of the present invention have excellent toughness and heat resistance, which enable sterilization by boiling or high pressure steam, and therefore can also be suitably used in the fields of medical, sanitary materials, foods, cosmetics and the like.

Among the molded articles of the present invention, heat-adhesive polylactic acid fibers comprise conjugate fibers of polylactic acid-based polymers having different melting points and, therefore, only one polymer portion can be melted, by heating and pressing at a given temperature, to fuse the fibers together with maintaining the shape of fibers. For this reason, the use of the heat-adhesive polyactic acid fiber of the present invention can make it possible to manufacture a totally complete circulation type biodegradable non-woven fabric without a binder. The obtained non-woven fabric has sufficient tensile strength, tearing resistance and peel strength and, therefore, is suitable for uses such as bags for civil engineering and construction, vegetation mats and the like, and is also suitable as clothes and sanitary goods. The fabric is of high utility value as completely biodegradable materials which have not been hitherto obtained, and is particularly useful as a wound covering material having biocompatibility.

Also, when the filament yarns which are a molded article of the present invention, are laid crosswise at a right angle or formed into a low density woven fabric or a plain gauze and the crossing points of the yarns are melted to fuse together, an extra light weight net can be obtained as a novel completely biodegradable packaging materials. Further an air-tight cloth can be obtained by passing a knitted woven cloth through heat calender rolls to fuse surface of them.

The fibers which are the molded articles in the present invention may be used for obtaining continuous filament, cut staple, and various fibers by Spun-Bond method, flush spinning method and the like.

In the usual clothing field too, the fibers of the present invention can be used for inner wears and stockings to which no application has been made, because the Young's modulus and elastic recovery were on the same level as nylon.

We claim:

1. A biodegradable copolyester comprising an L-lactic acid and/or D-lactic acid component as a main component and having a weight average molecular weight of at least 50,000, produced by copolymerizing said lactic acid component with at least one member of (A) 0.1 to 15% by weight of a polyethylene glycol having a number average molecular weight of at least 300, (B) an aliphatic polyester and (C) a sulfo group-containing aromatic compound having two ester-forming groups.

2. The biodegradable copolyester of claim 1, wherein the biodegradable copolyester comprising the L-lactic acid and/or D-lactic acid component as a main component produced by copolymerizing with the polyethylene glycol having a number average molecular weight of at least 300 is one produced by copolymerizing 99.9 to 85% by weight of the L-lactic acid and/or D-lactic acid component and 0.1 to 15% by weight of the polyethylene glycol having a number average molecular weight of at least 300, and the melting point is not less than 110° C.

3. The biodegradable copolyester of claim 1, wherein the biodegradable copolyester comprising the L-lactic acid and/or D-lactic acid component as a main component produced by copolymerizing with the aliphatic polyester is one produced by copolymerizing 99.5 to 85% by weight of the L-lactic acid and/or D-lactic acid component and 0.5 to 15% by weight of the aliphatic polyester, and the weight average molecular weight is not less than 80,000 and the melting point is not less than 110° C.

4. The biodegradable copolyester of claim 1, wherein the biodegradable copolyester comprising the L-lactic acid and/or D-lactic acid component as a main component produced by copolymerizing with the sulfo group-containing aromatic compound having two ester-forming groups is one produced by copolymerizing 99.5 to 80% by weight of the L-lactic acid and/or D-lactic acid component and 0.5 to 20% by weight of the sulfo group-containing aromatic compound having two ester-forming groups.

5. A molded article produced by melt-forming a biodegradable copolyester comprising an L-lactic acid and/or D-lactic acid component as a component and having a weight average molecular weight of at least 50,000, said copolyester being produced by copolymerizing said lactic acid component with at least one member of (A) a polyethylene glycol having a number average molecular weight of at least 300, (B) an aliphatic polyester and (C) a sulfo group-containing aromatic compound having two ester-forming groups.

6. The molded article of claim 5, wherein said molded article produced by melt-forming is a conjugate fiber comprising (a) a biodegradable copolyester having a melting point Ta and (b) a biodegradable copolyester which has a melting point lower than Ta by at least 10° C. or which is amorphous and has no melting point.

7. The molded article of claim 5, wherein said molded article produced by melt-forming is composed of a sheath made of a less degradable copolyester that the rate of degradation by biodegradation or by hydrolysis in neutral water or aqueous solution is low, and a core made of a biodegradable copolyester having a rate of degradation of at least 2 times the rate of degradation of said sheath, and both said core and sheath components are molecular-oriented.

8. The molded article of claim 5, wherein said molded article produced by melt-forming is a dividable conjugate fiber made of said biodegradable copolyester and a fiber-forming copolyester containing at least 40% by weight of a component derived from an aromatic compound, wherein said fiber-forming copolyester is divided by said biodegradable copolyester into a plurality of segments in the transverse section of the single fiber and said biodegradable copolyester occupies at least a part of the fiber surface.

9. A process for producing a molded article of a biodegradable copolyester, which comprises subjecting a molten mixture containing at least one lactic acid component selected from the group consisting of L-lactic acid, D-lactic acid, L-lactide and D-lactide and at least one member selected from the group consisting of (A) a polyethylene glycol having a number average molecular weight of at least 300, (B) an aliphatic polyester and (C) a sulfo group-containing aromatic compound having two ester-forming groups to a melt-polymerization in a continuous polymerization manner for less than one hour to produce a biodegradable copolyester having a weight average molecular weight of at least 50,000, introducing said copolyester directly to a molding machine without solidification and pelletization thereof, and melt-forming said copolyester into an article.

10. The process of claim 9, wherein said molten mixture contains 99.5 to 85% by weight of said lactic acid component and 0.1 to 15% by weight of said polyethylene glycol (A), and said biodegradable copolyester has a weight average molecular weight of at least 70,000 and is directly led to a spinning head without solidification and pelletization thereof and is subjected to melt-spinning, drawing at least three times and heat-treatment to impart a fiber strength of at least 3 g/d while maintaining said weight average molecular weight of at least 70,000.

11. The biodegradable copolyester of claim 1, wherein the content of said lactic acid component is 85 to 99.5% by weight.

12. The biodegradable copolyester of claim 1, wherein the content of said lactic acid component is 90 to 99.9% by weight.

13. The biodegradable copolyester of claim 1, which has a weight average molecular weight of at least 80,000.

14. The biodegradable copolyester of claim 1, which has a weight average molecular weight of at least 100,000.

15. The biodegradable copolyester of claim 1 further comprising a chain extending agent selected from the group consisting of a dicarboxylic acid component and a diol component.

16. The biodegradable copolyester of claim 1, which is a polylactic acid/polyethylene glycol copolymer wherein a polylactic acid segment is attached to each of terminal hydroxyl groups of a polyethylene glycol chain through ester linkage and lactic acid molecules in said polylactic acid segment are linked to each other through ester linkages.

17. The biodegradable copolyester of claim 16, said polylactic acid/polyethylene glycol copolymer has a weight average molecular weight of at least 60,000.

18. The biodegradable copolyester of claim 16, wherein said polylactic acid/polyethylene glycol copolymer has a melting point of not less than 130° C.

19. The biodegradable copolyester of claim 16, wherein said polylactic acid/polyethylene glycol copolymer has a melting point of not less than 150° C.

20. The biodegradable copolyester of claim 16, where said polyactic acid/polyethylene glycol copolymer further contains a copolymerized residue that is at least one member selected from the group consisting of dicarboxylic acid, a sulfo group-containing compound and an amino or amido group-containing compound.

21. The biodegradable copolyester of claim 16, wherein the content of lactic acid in said polylactic acid/polyethylene glycol copolymer is 85 to 99.5% by weight.

22. The biodegradable copolyester of claim 1, which is polylactic acid/aliphatic polyester copolymer containing 0.5 to 15% by weight of said aliphatic polyester, wherein a polylactic acid segment is attached to each of terminal groups of an aliphatic polyester chain through ester linkage.

23. The process of claim 9, wherein a chain extending agent is added to said molten mixture.

24. The process of claim 9, wherein said lactic acid component is L-lactide, D-lactide or a mixture thereof.

* * * * *